(12) United States Patent
Horikoshi et al.

(10) Patent No.: US 11,029,723 B1
(45) Date of Patent: Jun. 8, 2021

(54) KEYBOARD DEVICE

(71) Applicant: LENOVO (SINGAPORE) PTE. LTD., Singapore (SG)

(72) Inventors: Seita Horikoshi, Yokohama (JP); Yoshiyuki Shibayama, Yokohama (JP)

(73) Assignee: LENOVO (SINGAPORE) PTE. LTD., Singapore (SG)

(*) Notice: Subject to any disclaimer, the term of this patent is extended or adjusted under 35 U.S.C. 154(b) by 0 days.

(21) Appl. No.: 16/903,767

(22) Filed: Jun. 17, 2020

(30) Foreign Application Priority Data

May 14, 2020 (JP) .............................. JP2020-085143

(51) Int. Cl.
 *G06F 1/16* (2006.01)
 *G06F 3/02* (2006.01)
 *H01H 13/04* (2006.01)
 *H01H 13/70* (2006.01)

(52) U.S. Cl.
 CPC .......... *G06F 1/1616* (2013.01); *G06F 1/1666* (2013.01); *G06F 3/02* (2013.01); *H01H 13/04* (2013.01); *H01H 13/70* (2013.01)

(58) Field of Classification Search
 CPC ...... G06F 1/166; G06F 1/1662; G06F 1/1666; G06F 3/0202; G06F 3/0208; G06F 1/1616; G06F 1/1624; H01H 13/186; H01H 3/122; H01H 3/125; H01H 2223/052; H01H 2231/042; H01H 13/84; H01H 2223/05
 See application file for complete search history.

(56) References Cited

U.S. PATENT DOCUMENTS

| 5,543,787 | A | 8/1996 | Karidis et al. |
| 5,659,307 | A * | 8/1997 | Karidis ................ G06F 1/1616 341/20 |
| 2018/0358193 | A1* | 12/2018 | Chen ....................... H01H 13/88 |
| 2019/0121399 | A1* | 4/2019 | Ku .......................... G06F 1/169 |
| 2020/0201399 | A1* | 6/2020 | Guy ........................ G06F 1/166 |

FOREIGN PATENT DOCUMENTS

| JP | 7-271491 A | 10/1995 |
| JP | 2004192592 A | 7/2004 |

* cited by examiner

*Primary Examiner* — Nelson M Rosario
(74) *Attorney, Agent, or Firm* — Shimokaji IP

(57) ABSTRACT

A keyboard device includes: a base member having a top face on which a first unit and a second unit are placed; a driving part configured to relatively move the first unit and the second unit between a storage position and a usage position; at the storage position, the first side face and the second side face meshing with each other while being displaced in a front-rear direction of the keyboard device; at the usage position, the first side face and the second side face meshing with each other without being displaced in the front-rear direction so that the units are placed side by side in a left-right direction of the keyboard device to define a single keyboard; and an operating member configured to move the first unit and the second unit between the usage position and the storage position.

11 Claims, 10 Drawing Sheets

KEYBOARD DEVICE

FIELD OF THE INVENTION

The present invention relates to keyboard devices.

BACKGROUND OF THE INVENTION

Portable information devices, such as tablet PCs and smartphones, typically do not have a keyboard device. For this type of portable information devices also, there is a demand to use a full-size keyboard device as in a typical laptop PC to improve the work efficiency during creation of a long sentence.

Such a full-sized keyboard device has a larger outer shape than a typical portable information device, and it is inconvenient to carry such a keyboard device. Japanese Unexamined Patent Application Publication No. 2004-192592, for example, proposes a keyboard device that can be made compact for carrying or storing by folding it in the center of the left and right.

SUMMARY OF THE INVENTION

The keyboard device of Japanese Unexamined Patent Application Publication No. 2004-192592 is configured so that the entire device is folded in half at the center. This keyboard device therefore may cause continuously erroneous inputting with one key, because when a user closes the device after use, they may unintentionally press the key with a finger, for example.

Like a typical laptop PC, the keyboard device of Japanese Unexamined Patent Application Publication No. H07-271491 is integrally incorporated in the chassis of the PC. This keyboard device operates in response to opening and closing of the display chassis (lid), and so there is no concern of user's erroneous operations of the keys after use, unlike the configuration of Japanese Unexamined Patent Application Publication No. 2004-192592 as described above. This keyboard device, however, is completely different in structure and handling from stand-alone keyboard devices. It is therefore difficult to use the configuration of this keyboard device interlocking with the display chassis in a stand-alone keyboard device.

In view of the above problems of the conventional technology, the present invention provides a keyboard device capable of suppressing an erroneous operation when a user folds it to be compact after use.

A keyboard device according to the first aspect of the present invention includes: a first unit having a plurality of key tops and a stepwise first side face; a second unit having a plurality of key tops and a stepwise second side face to abut the first side face for meshing with the first side face, the second unit being disposed adjacent to the first unit; a base member having a top face on which the first unit and the second unit are placed, the base supporting the first unit and the second unit relatively movably on the top face; a driving part configured to relatively move the first unit and the second unit between a storage position and a usage position by relatively turning and moving the first unit and the second unit in a same direction so that the first unit and the second unit move along an arc from the storage position to the usage position; at the storage position, the first side face and the second side face meshing with each other while being displaced in a front-rear direction of the keyboard device; at the usage position, the first side face and the second side face meshing with each other without being displaced in the front-rear direction so that the units are placed side by side in a left-right direction of the keyboard device to define a single keyboard; and an operating member having an operating part exposed on a top face of the base, the operating member being configured to move the first unit and the second unit between the usage position and the storage position in response to a user's operation of the operating part to move the driving part.

The base may have an opening in the top face, the opening always being at least partially exposed on the top face regardless of position of the first unit and the second unit, the operating member may have an operating lever that is slidably supported inside the base, and the operating part may be disposed on the operating lever and may be exposed on the top face of the base through the opening.

The keyboard device further may include a shutter member configured to operate interlocking with the operating lever, and open and close the opening. The shutter member may be placed at a position rearward from the opening when the first unit and the second unit are in the storage position, and may be placed at a position covering the opening when the first unit and the second unit are in the usage position.

The driving part may include: a first gear configured to be rotatably supported relative to the base and having a first arm protruding from the outer peripheral face, the first arm having a first connecting shaft at the distal end, the first gear rotatably connecting to the first unit via the first connecting shaft; a second gear configured to be rotatably supported relative to the base and having a second arm protruding from the outer peripheral face, the second arm having a second connecting shaft at the distal end, the second gear rotatably connecting to the second unit via the second connecting shaft; a relay gear configured to be rotatably supported relative to the base, the relay gear meshing with the first gear and the second gear to rotate the first gear and the second gear in a same direction and in a synchronized manner; and a pinion configured to be rotatably supported relative to the base, the pinion meshing with the relay gear. The operating member may further include a rack disposed inside the base to be integral and slidable with the operating lever, the rack meshing with the pinion.

At the storage position, the first unit may be placed along a front edge of the top face of the base, and the second unit may be placed along a rear edge of the top face of the base, and the opening may be placed at a part of the base that is lateral to a frontmost side face part of the stepwise first side face, and near a corner between the front edge and a side edge of the base.

The base may have at least one rubber foot on the bottom face, and the at least one rubber foot may be placed at a position overlapping the operating lever.

The keyboard device may further include a first magnet attraction part configured to hold a relative position between the driving part and the base in the storage position.

The keyboard device may further include a second magnet attraction part configured to hold a relative position between the first side face and the second side face in the usage position.

The keyboard device may further include: a power switch configured to turn on the keyboard device during movement of the first unit and the second unit from the storage position to the usage position at a place closer to the usage position than a middle point of a movement range between the storage position and the usage position; and a wireless communication module configured to wirelessly transmit a signal from the keyboard device to an external device when the power switch turns on the keyboard device.

A keyboard device according to the second aspect of the present invention include: a first unit having a plurality of key tops and a stepwise first side face; a second unit having a plurality of key tops and a stepwise second side face to abut the first side face for meshing with the first side face, the second unit being disposed adjacent to the first unit; a base member having a top face on which the first unit and the second unit are placed, the base supporting the first unit and the second unit relatively movably on the top face; a driving part configured to relatively move the first unit and the second unit between a storage position and a usage position by relatively turning and moving the first unit and the second unit in a same direction so that the first unit and the second unit move along an arc from the storage position to the usage position; at the storage position, the first side face and the second side face meshing with each other while being displaced in a front-rear direction of the keyboard device; at the usage position, the first side face and the second side face meshing with each other without being displaced in the front-rear direction so that the units are placed side by side in a left-right direction of the keyboard device to define a single keyboard; a power switch configured to turn on the keyboard device during movement of the first unit and the second unit from the storage position to the usage position at a place closer to the usage position than a middle point of a movement range between the storage position and the usage position; and a wireless communication module configured to wirelessly transmit a signal from the keyboard device to an external device when the power switch turns on the keyboard device.

The above-described aspects of the present invention suppress an erroneous operation with a keyboard device when a user folds it to be compact after use.

DETAILED DESCRIPTION OF THE INVENTION

Figure 1:
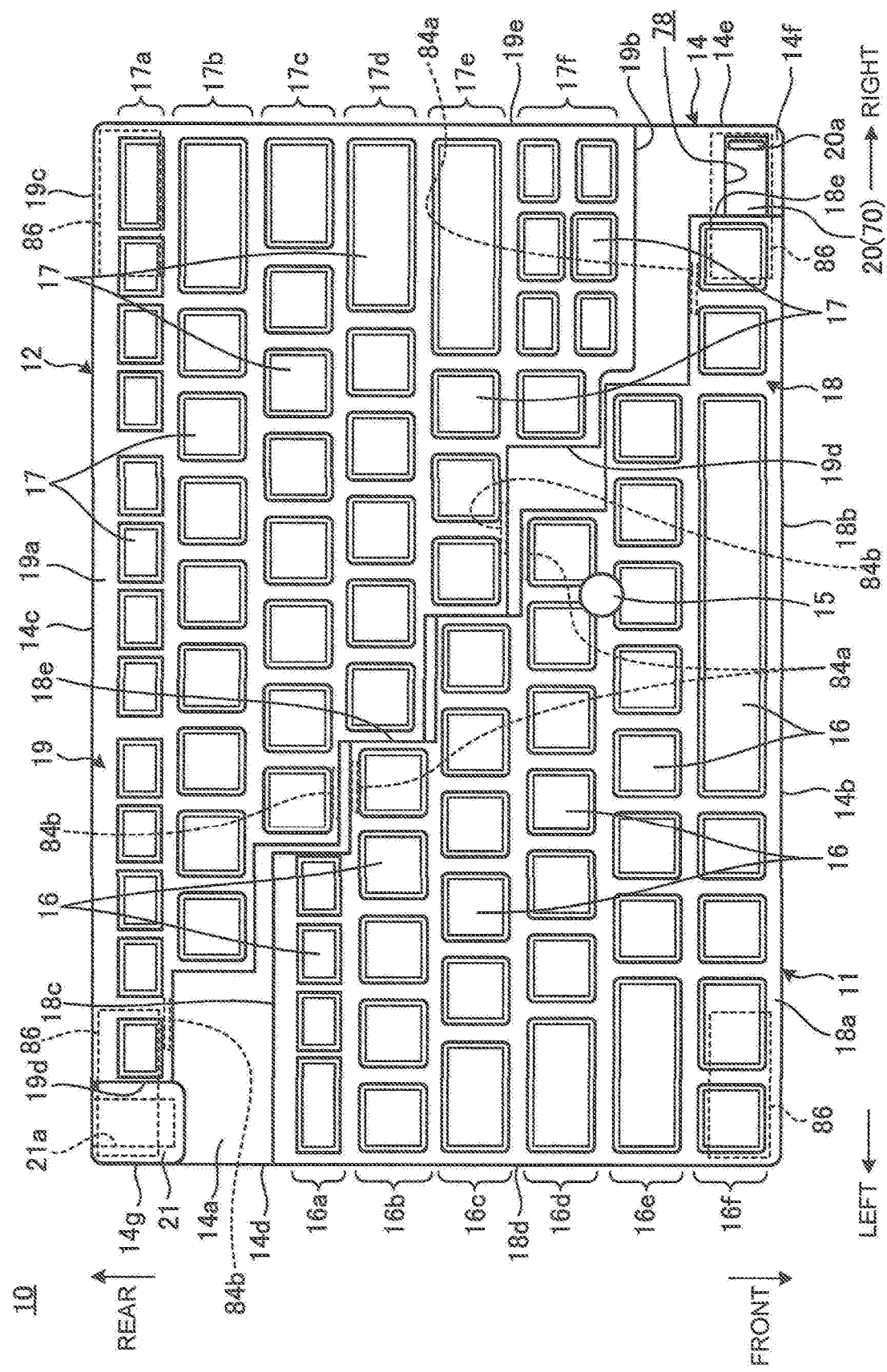
FIG. 1 is a plan view of a keyboard device according to one embodiment in a storage mode.

Referring to the drawings, the following describes a keyboard device according to the present invention in details by way of a preferable embodiment.

Figure 2:
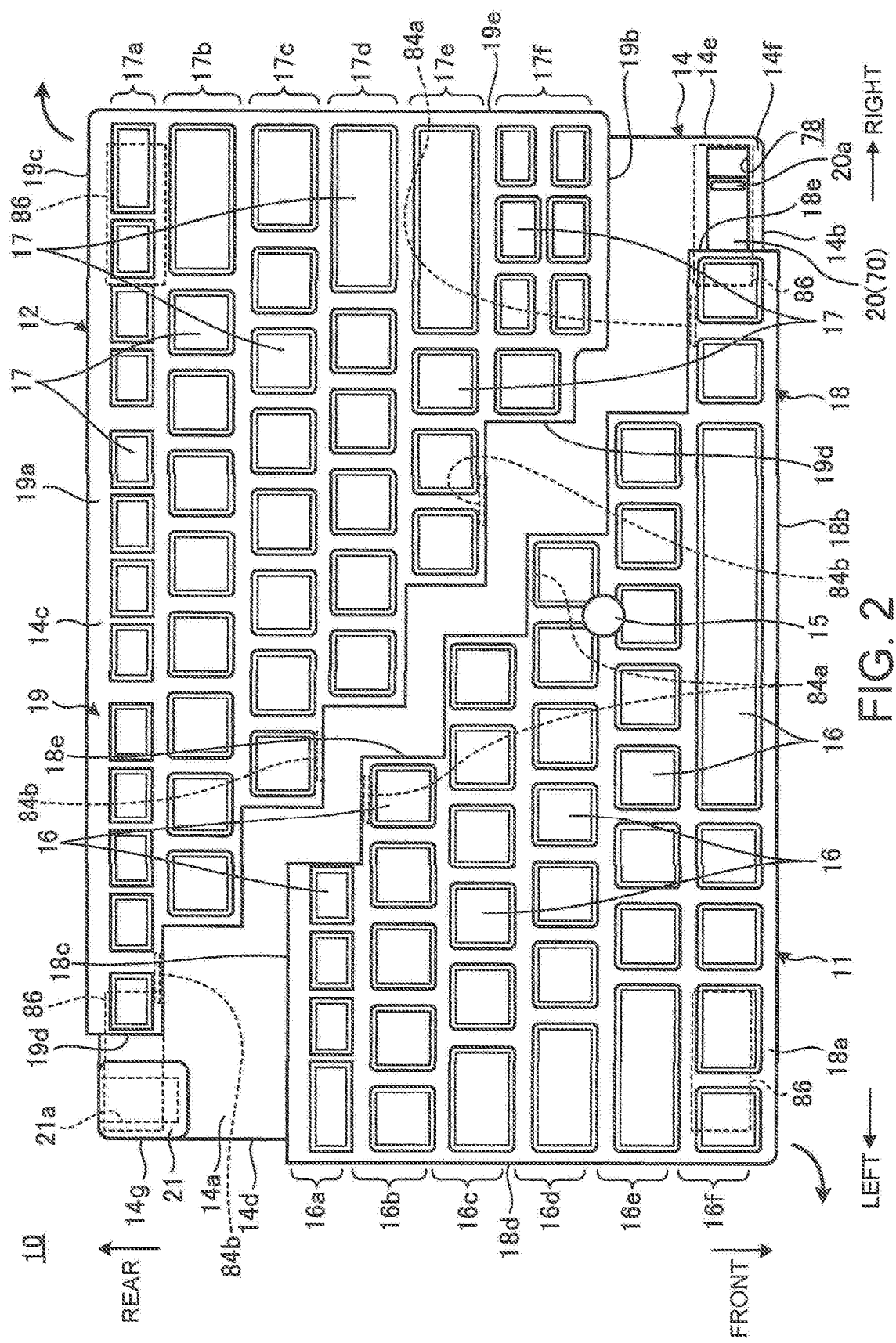
FIG. 2 is a plan view of the keyboard device during a change from the storage mode of FIG. 1 to the usage mode of FIG. 4.
Figure 3:
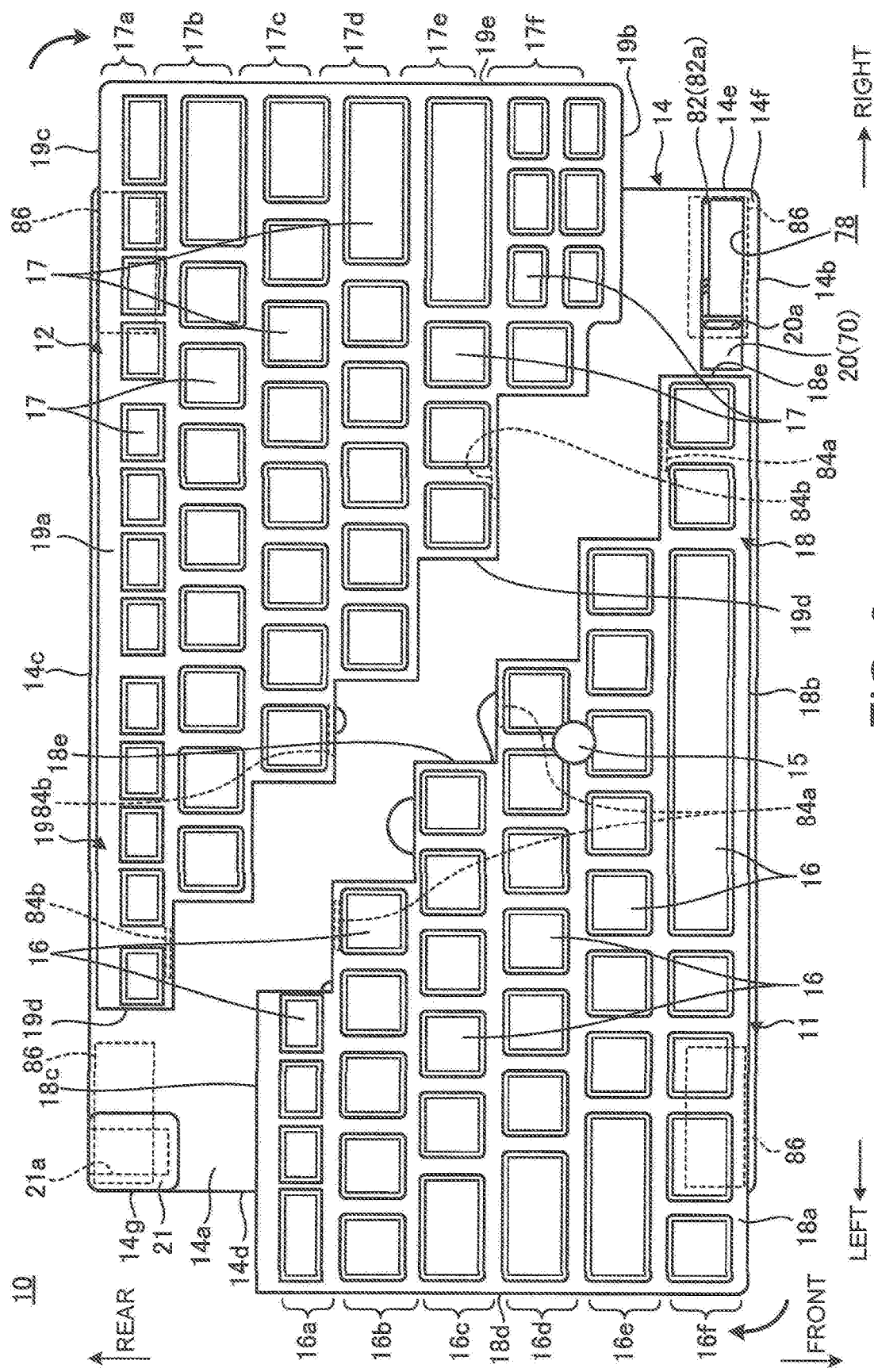
FIG. 3 is a plan view of the keyboard device during a change from the storage mode of FIG. 1 to the usage mode of FIG. 4.
Figure 4:
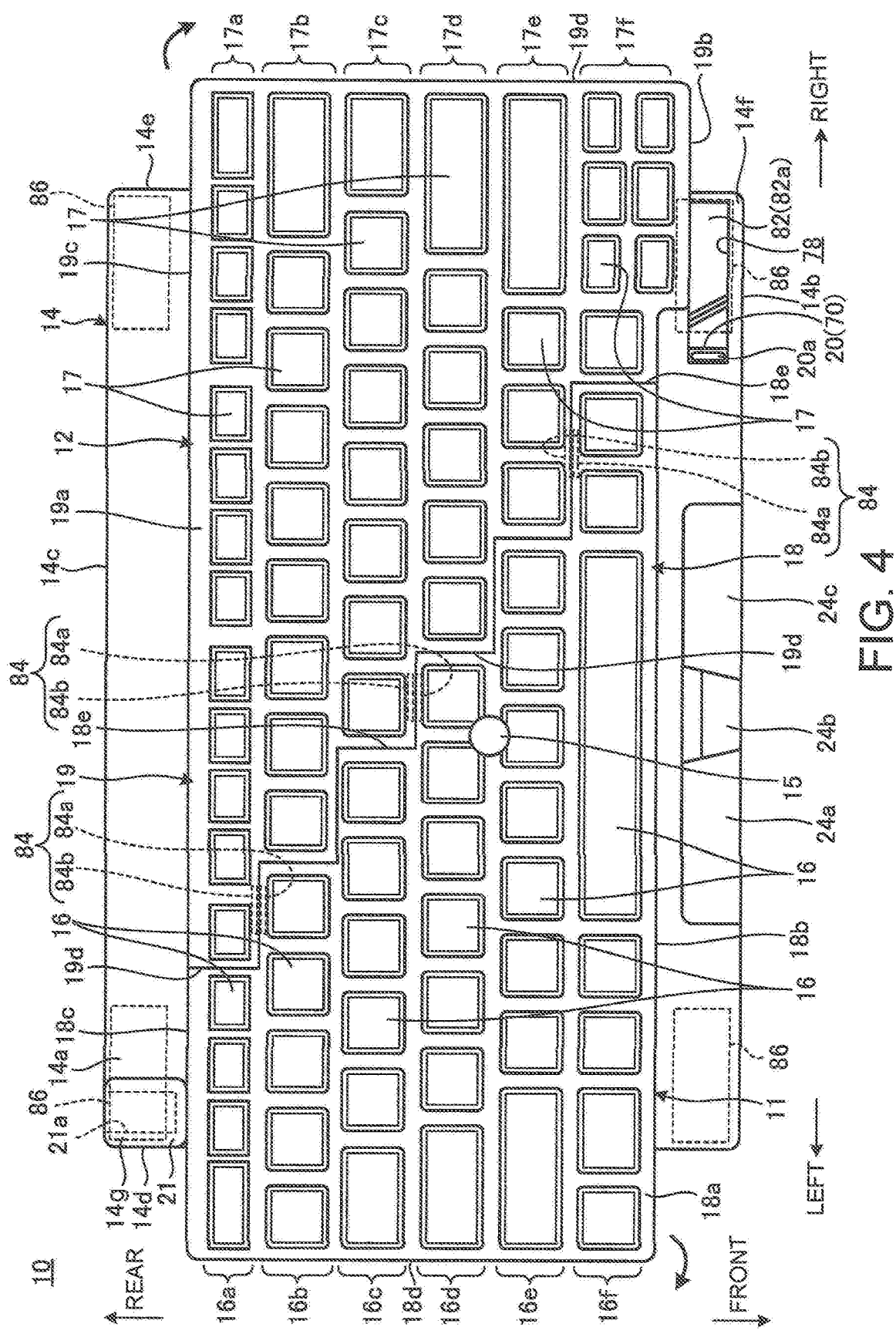
FIG. 4 is a plan view of the keyboard device in a usage mode.

FIG. 1 is a plan view of a keyboard device 10 in a storage mode according to one embodiment. FIG. 2 and FIG. 3 are plan views of the keyboard device 10 during a change from the storage mode in FIG. 1 to the usage mode in FIG. 4. FIG. 4 is a plan view of the keyboard device 10 in a usage mode. The keyboard device 10 of the present embodiment is an external keyboard to be used with a portable information device, such as a tablet PC or a smartphone. The keyboard device 10 connects to such a portable information device as an external device by near field communication standard (e.g., Bluetooth (registered trademark)), for example. The keyboard device 10 may be configured to connect to the portable information device by wire via a USB-compliant connector, for example.

As illustrated in FIG. 1 to FIG. 4, the keyboard device 10 includes a first unit 11, a second unit 12, and a base 14. The following describes the keyboard device 10 while referring to the direction toward the user using the keyboard device 10 in the usage mode of FIG. 4 as front, the direction away from the user as rear, the width direction as left and right (or lateral), and the thickness direction as top and bottom.

The keyboard device 10 includes the first unit 11 and the second unit 12 that are divided left and right parts of a typical full-size keyboard. These units are supported movably on a top face 14a of the base 14. The units 11 and 12 are movable between the storage position of FIG. 1 and the usage position of FIG. 4. This allows the keyboard device 10 to change between a storage mode in which the outer shape is reduced (see FIG. 1) and a usage mode in which the outer dimension is enlarged (see FIG. 4). The keyboard device in the storage mode is easy to carry and store in a bag, for example. The keyboard device in the usage mode allows comfortable typing as a full-size keyboard.

The first unit 11 is a left part of the keyboard device 10. The first unit 11 has a key top group including a plurality of key tops 16 and a first unit base 18.

Each key top 16 is an operating face of the key, and is supported by the first unit base 18 to be movable up and down. The support structure of each key top 16 may have a known structure. In one example, each key top 16 moves up and down via a rubber dome and a scissor mechanism (not illustrated) disposed in the first unit base 18. The pitch between the key tops 16 and 16 is set to a full size of about 18 to 19 mm, for example.

The first unit 11 has a configuration in which a plurality of rows, in each of which a plurality of keytops 16 are disposed in the left-right direction, are arranged in the front-rear direction. In this embodiment, the first unit 11 includes a first row 16a, a second row 16b, a third row 16c, a fourth row 16d, a fifth row 16e, and a sixth row 16f in this order from the rear to the front. In these rows 16a to 16f, the left side faces of the leftmost key tops 16 are along a line in the front-rear direction. In these rows 16a to 16f, the rightmost key tops 16 are gradually displaced to the right by about 1 or 2 left-right widths of the keytops 16 from the first row 16a to the sixth row 16f to be disposed in a stepwise manner.

The first row 16a in this embodiment has four key tops 16 disposed in the left-right direction that mainly function as ESC key and function keys. The second row 16b has five key tops 16 disposed in the left-right direction that mainly function as numeric keys. The third row 16c has six key tops 16 disposed in the left-right direction that mainly function as Tab key and alphabet keys. The fourth row 16d has seven key tops 16 disposed in the left-right direction that mainly function as CapsLock key and alphabet keys. The fifth row 16e has eight key tops 16 disposed in the left-right direction that mainly function as Shift key and alphabet keys. The sixth row 16f has seven key tops 16 disposed in the left-right direction that mainly function as Fn key, Ctrl key, Alt key and space key. The arrangement and the number of key tops 16 in each row 16a to 16f can be changed as appropriate.

The keyboard device 10 of the present embodiment has a pointing stick 15. The pointing stick 15 is an input device to operate a cursor (mouse pointer) displayed on the display of the portable information device when the keyboard device 10 connects thereto, and a user can operate the pointing stick 15 in place of the mouse. The first unit 11 includes the pointing stick 15 between the fourth row 16d and the fifth row 16e, for example.

Figure 6:
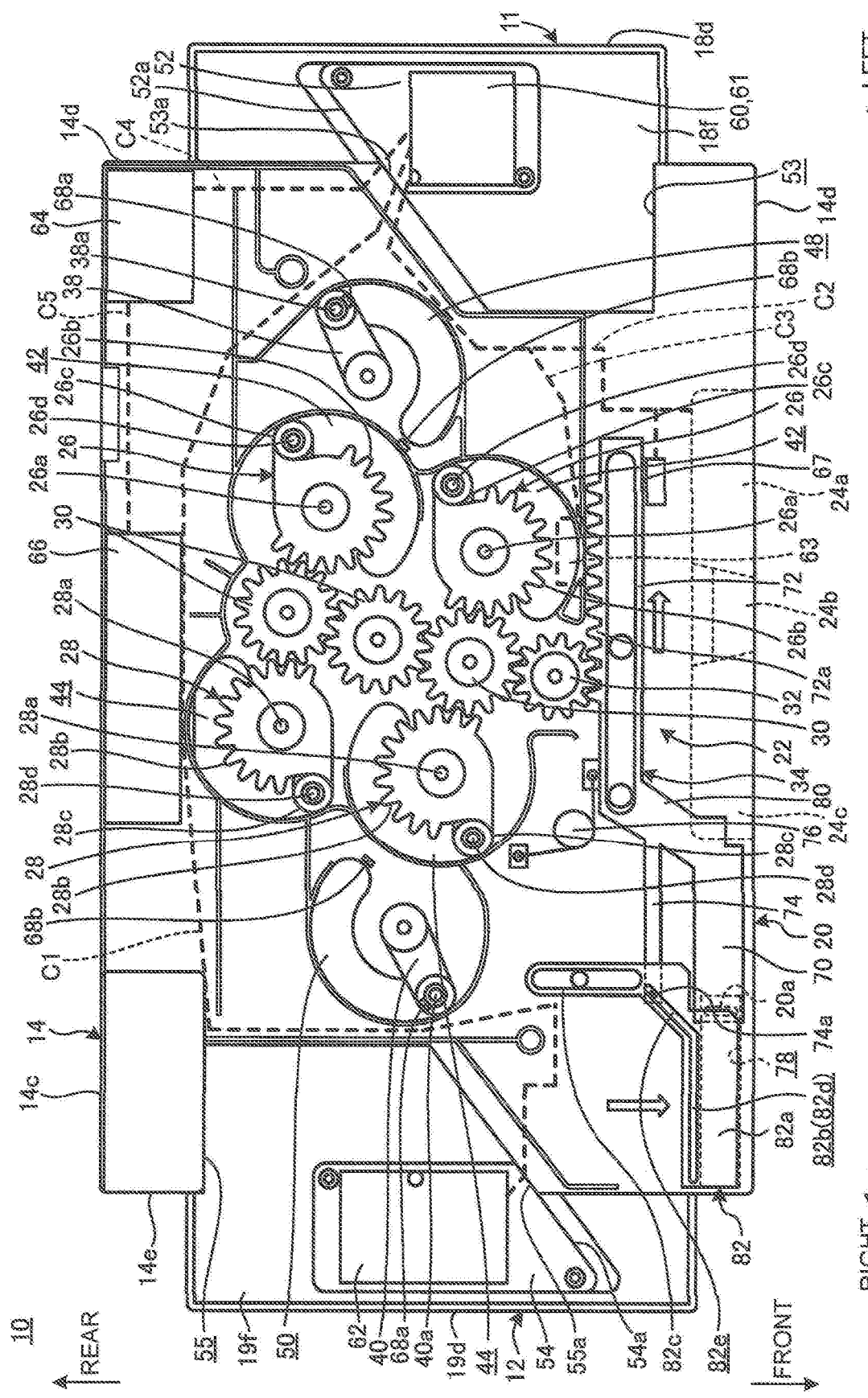
FIG. 6 is a bottom view schematically illustrating the internal configuration of the keyboard device in the usage mode in FIG. 4.

The first unit base 18 is a box-shaped chassis having a surface 18a, a front side face 18b, a rear side face 18c, a left side face 18d and a right side face 18e, and has a bottom face closed by a base plate 18f (see FIG. 6). In one example, the first unit base 18 is made of resin or metal. The surface 18a is like a net having many holes, and the key tops 16 are disposed to be movable up and down in the corresponding holes. That is, the net in the surface 18a serves as a frame partitioning the adjacent key tops 16 and 16. The base plate 18f forms the back surface of the first unit base 18, and is a thin metal plate, for example. The base plate 18f serves as a plate to mount a membrane sheet, which detects the depressing operation of each key top 16, and the rubber dome and the guide mechanism described above.

The front side face 18b includes a flat plate extending straight in the left-right direction, and has a left-right width that is the maximum left-right width of the first unit base 18. The left side face 18d includes a flat plate extending straight in the front-rear direction, and has a front-rear dimension that is the maximum front-rear dimension of the first unit base 18. The rear side face 18c includes a flat plate extending straight in the left-right direction, and has a left-right width that is smaller than that of the front side face 18b (about ⅓). The left end of the rear side face 18c coincides with the rear end of the left side face 18d.

The right side face 18e connects the right end of the rear side face 18c and the right end of the front side face 18b, which are different in position in the left-right direction, in a stepwise manner. The right side face 18e is gradually displaced to the right from the rear to the front. This means that the left-right width of the first unit base 18 becomes wider in a stepwise manner from the rear to the front. The right side face 18e of the present embodiment has a stepwise shape that is sequentially displaced to the right from the row 16a to the row 16f. This stepwise shape of the right side face 18e can be changed as appropriate. For example, the adjacent rows like the first row 16a and the second row 16b may not be displaced, and other rows may be displaced every two rows to be in a stepwise manner.

The second unit 12 is a right part of the keyboard device 10. The second unit 12 has a key top group including a plurality of key tops 17 and a second unit base 19.

Each key top 17 is an operating face of the key, and is supported by the second unit base 19 to be movable up and down. The support structure and the structure to move up and down of each key top 17 is the same as those of the key tops 16 stated above. Similar to the key tops 16, the pitch between the key tops 17 and 17 is set to a full size of about 18 to 19 mm, for example.

The second unit 12 also has a configuration in which a plurality of rows, in each of which a plurality of keytops 17 are disposed in the left-right direction, are arranged in the front-rear direction. In this embodiment, the second unit 12 includes a first row 17a, a second row 17b, a third row 17c, a fourth row 17d, a fifth row 17e, and a sixth row 17f in this order from the rear to the front. In these rows 17a to 17f, the right side faces of the rightmost key tops 17 are along a line in the front-rear direction. In these rows 17a to 17f, the leftmost key tops 17 are gradually displaced to the right by about 1 or 2 left-right widths of the keytops 17 from the first row 17a to the sixth row 17f to be disposed in a stepwise manner.

The first row 17a in this embodiment has thirteen key tops 17 disposed in the left-right direction that mainly function as Delete key, Insert key, and function keys. The second row 17b has nine key tops 17 disposed in the left-right direction that mainly function as Backspace key and numeric keys. The third row 17c has eight key tops 17 disposed in the left-right direction that mainly function as symbol keys and alphabet keys. The fourth row 17d has six key tops 17 disposed in the left-right direction that mainly function as Enter key and alphabet keys. The fifth row 17e has four key tops 17 disposed in the left-right direction that mainly function as Shift key and symbol keys. The sixth row 17f has seven key tops 17 disposed in the left-right direction and in front-rear two rows that mainly function as arrow keys and Ctrl key. In the present embodiment, the sixth row 17f is treated as one line, and this may be treated as two lines and divided into two rows. The arrangement and the number of key tops 17 can be changed as appropriate.

The second unit base 19 is a box-shaped chassis having a surface 19a, a front side face 19b, a rear side face 19c, a left side face 19d and a right side face 19e, and has a bottom face closed by a base plate 19f (see FIG. 6). The materials of the faces 19a to 19e of the second unit base 19 and the base plate 19f may be the same as those of the faces 18a to 18e of the first unit base 18 and the base plate 18f.

The rear side face 19c includes a flat plate extending straight in the left-right direction, and has a left-right width that is the maximum left-right width of the second unit base 19. The right side face 19e includes a flat plate extending straight in the front-rear direction, and has a front-rear dimension that is the maximum front-rear dimension of the second unit base 19. The front side face 19b extends in the left-right direction with a step at a part, and has a left-right width that is smaller than that of the rear side face 19c (about ⅓). The right end of the front side face 19b coincides with the front end of the right side face 19e.

The left side face 19d connects the left end of the rear side face 19c and the left end of the front side face 19b, which are different in position in the left-right direction, in a stepwise manner. The left side face 19d is gradually displaced to the right from the rear to the front. This means that the left-right width of the second unit base 19 becomes narrower in a stepwise manner from the rear to the front. The left side face 19d of the present embodiment has a stepwise shape is sequentially displaced to the right from the row 17a to the row 17f. Similar to the first unit base 18, the stepwise shape of the left side face 19d in the second unit base 19 can be changed as appropriate.

The base 14 is a rectangular flat plate-like chassis that serves as a support for the units 11 and 12. The base 14 is placed so that the back surfaces (base plates 18f, 19f) of the units 11 and 12 overlap the top face 14a. The base 14 supports the units 11 and 12 so that these units 11 and 12 are relatively movable along the top face 14a.

In the storage position of FIG. 1, the units 11 and 12 fit within the outer shape of the top face 14a of the base 14. That is, the side faces 18b to 18e and 19b to 19e of the units 11 and 12 in the storage position are flush with the four side faces 14b to 14e of the base 14 or are placed inside the side faces 14b to 14e. As a result, the keyboard device 10 is in a storage mode having the smallest outer shape.

Specifically, the units 11 and 12 are in contact with each other so that the side faces 18e and 19d of their unit bases 18 and 19 are displaced in the front-rear direction and mesh with each other. Specifically, a part of the fifth row 16e and of the sixth row 16f in the first unit 11 are placed in front of the front side face 19b of the second unit 12. A part of the first row 17a and of the second row 17b in the second unit 12 are placed behind the rear side face 18c of the first unit 11. This minimizes the total left-right width of the units 11 and 12.

The first unit 11 in the storage position is placed so that the front side face 18b is substantially flush with the front side face 14b of the base 14 and the left side face 18d is substantially flush with the left side face 14d of the base 14. The rear side face 18c is placed at a position offset forward from the rear side face 14c of the base 14 by the front-rear dimension of about two key tops 16. The stepwise right side face 18e is placed so that a part of the sixth row 16f protruding to the rightmost is offset to the left from the right side face 14e of the base 14 by the dimension of about one key top 16 in the left-right width direction. The second unit 12 is placed so that the rear side face 19c is substantially flush with the rear side face 14c of the base 14 and the right side face 19e is substantially flush with the right side face 14e of the base 14. The front side face 19b is placed at a position offset rearward from the front side face 14b of the base 14 by the front-rear dimension of about two key tops 16. The stepwise left side face 19d is placed so that a part of the first row 17a protruding to the leftmost is offset to the right from the left side face 14d of the base 14 by the dimension of about one key top 17 in the left-right width direction.

In the usage position of FIG. 4, the units 11 and 12 project to the left and the right, respectively, from the outer shape of the top face 14a of the base 14 to define a single full-sized keyboard. As a result, the keyboard device 10 is in a usage mode having the largest outer shape.

Specifically, the units 11 and 12 are in contact with each other so that the side faces 18e and 19d of their unit bases 18 and 19 are not displaced in the front-rear direction and mesh with each other. That is, the first row 16a through the sixth row 16f in the first unit 11 and the first row 17a through the sixth row 17f in the second unit 12 are disposed side by side in the left-right direction. This maximizes the total lateral width of the units 11 and 12.

In this way, the units 11 and 12 in the usage position have their front side faces 18b and 19b that coincide in the front-rear direction, and their rear side faces 18c and 19c that coincide in the front-rear direction. In this state, the first unit 11 projects to the left from the left side face 14d of the base 14. The second unit 12 projects to the right from the right side face 14e of the base 14. The front side faces 18b and 19b of the units 11 and 12 are placed at a position offset rearward from the front side face 14b of the base 14 by the front-rear dimension of about one key top 16. The rear side faces 18c and 19c of the units 11 and 12 are placed at a position offset forward from the rear side face 14c of the base 14 by the front-rear dimension of about one key top 16.

As illustrated in FIGS. 1 to 4, the base 14 has exposed parts 14f and 14g of the top face 14a, and the exposed parts 14f and 14g are always exposed to the outside in all of the states of the units 11 and 12, including the storage position, the usage position and an intermediate position in the middle of the operation to move between these positions. The exposed part 14f is at the right front corner of the top face 14a. The exposed part 14g is at the left rear corner of the top face 14a. The exposed part 14f is provided with an operation part 20a of an operating member 20. The exposed part 14g is provided with a bulging part 21.

The operating member 20 is a slide member to operate a unit driving mechanism 22 (see FIG. 5) described later. The operating part 20a is a tab that allows a user to manually operate the operating member 20 from the outside, and the user can operate this tab with a fingertip. The bulging part 21 is a thick part of the thin base 14 so that a connection terminal 21a can be placed. In one example, the connection terminal 21a is a USB-compliant female connector.

The base 14 includes three button switches 24a, 24b, and 24c along the front side face 14b of the top face 14a (see FIG. 4). The button switches 24a to 24c function as a click area enabling the outputting of at least a click signal from the mouse device. The button switches 24a to 24c in the present embodiment function in cooperation with the cursor operation with the pointing stick 15 that is like a mouse device. That is, the button switches 24a, 24b, 24c correspond to the left button, the middle button, and the right button of a mouse, for example. These button switches 24a to 24c are hidden under the first unit 11 in the storage mode of FIG. 1, and are exposed to be operable in the usage mode in FIG. 4. In another example, the mouse device may be a touch pad instead of the pointing stick. When the mouse device is a touch pad, the touch pad also functions as a click area and is hidden under the first unit 11.

Next, the following describes a configuration to change the keyboard device 10 of the present embodiment between the storage mode in FIG. 1 and the usage mode in FIG. 4. The keyboard device 10 can move the units 11 and 12 between the storage position and the usage position by the operating member 20 and a unit drive mechanism 22 mounted on the base 14.

Figure 5:
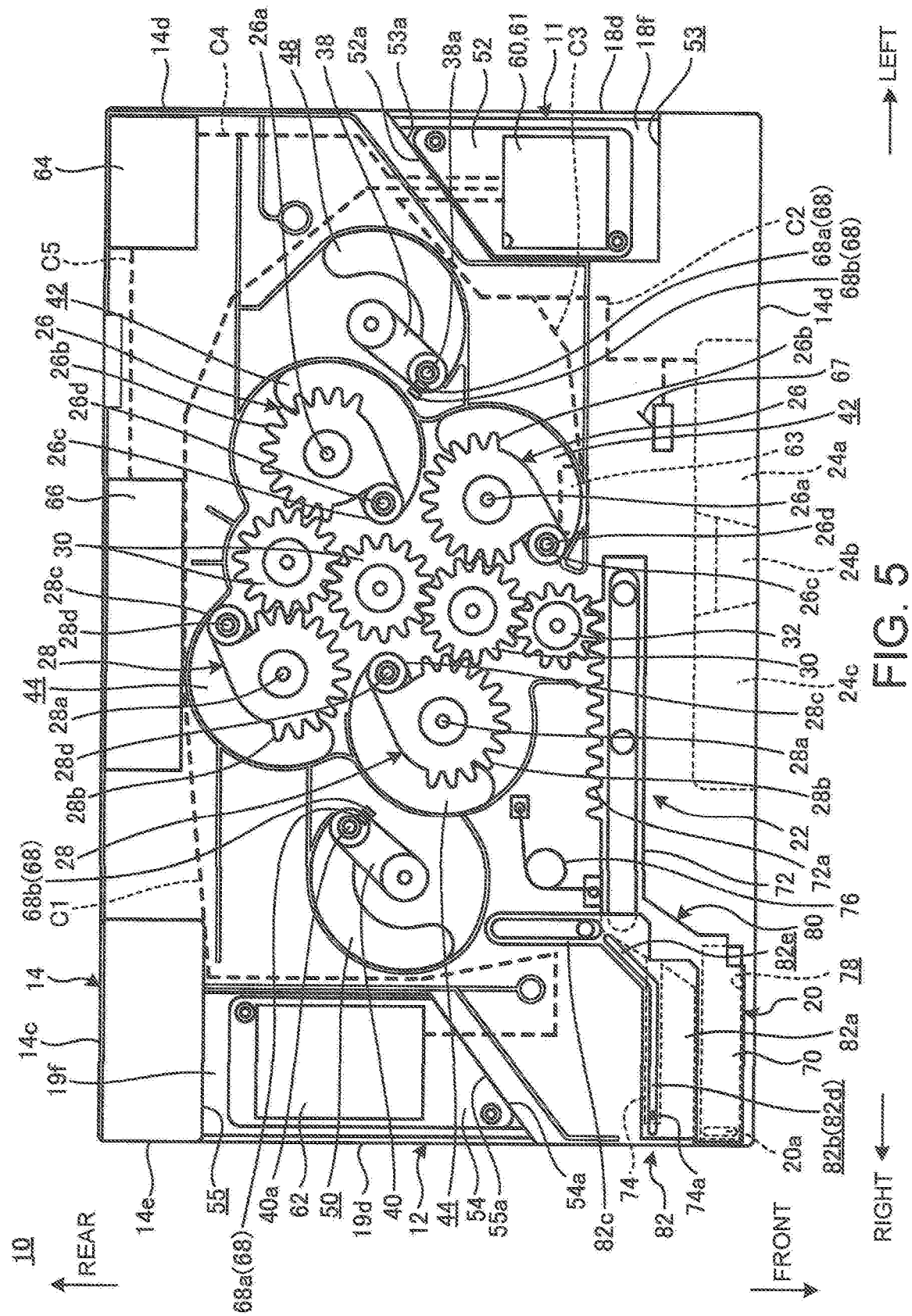
FIG. 5 is a bottom view schematically illustrating the internal configuration of the keyboard device in the storage mode in FIG. 1.
Figure 7:
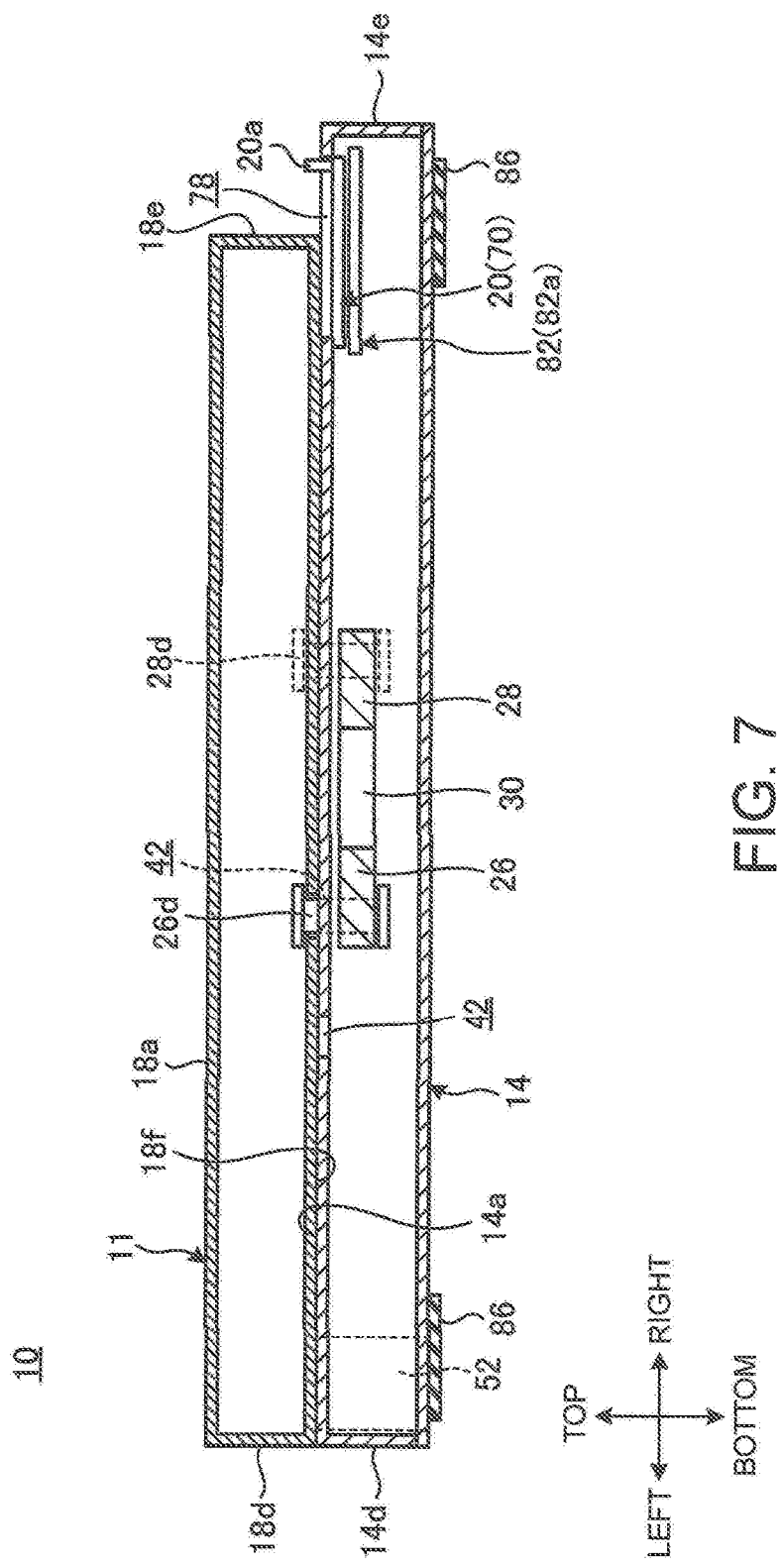
FIG. 7 is a schematic front cross-sectional view of the keyboard device in the storage mode in FIG. 1.
Figure 8:
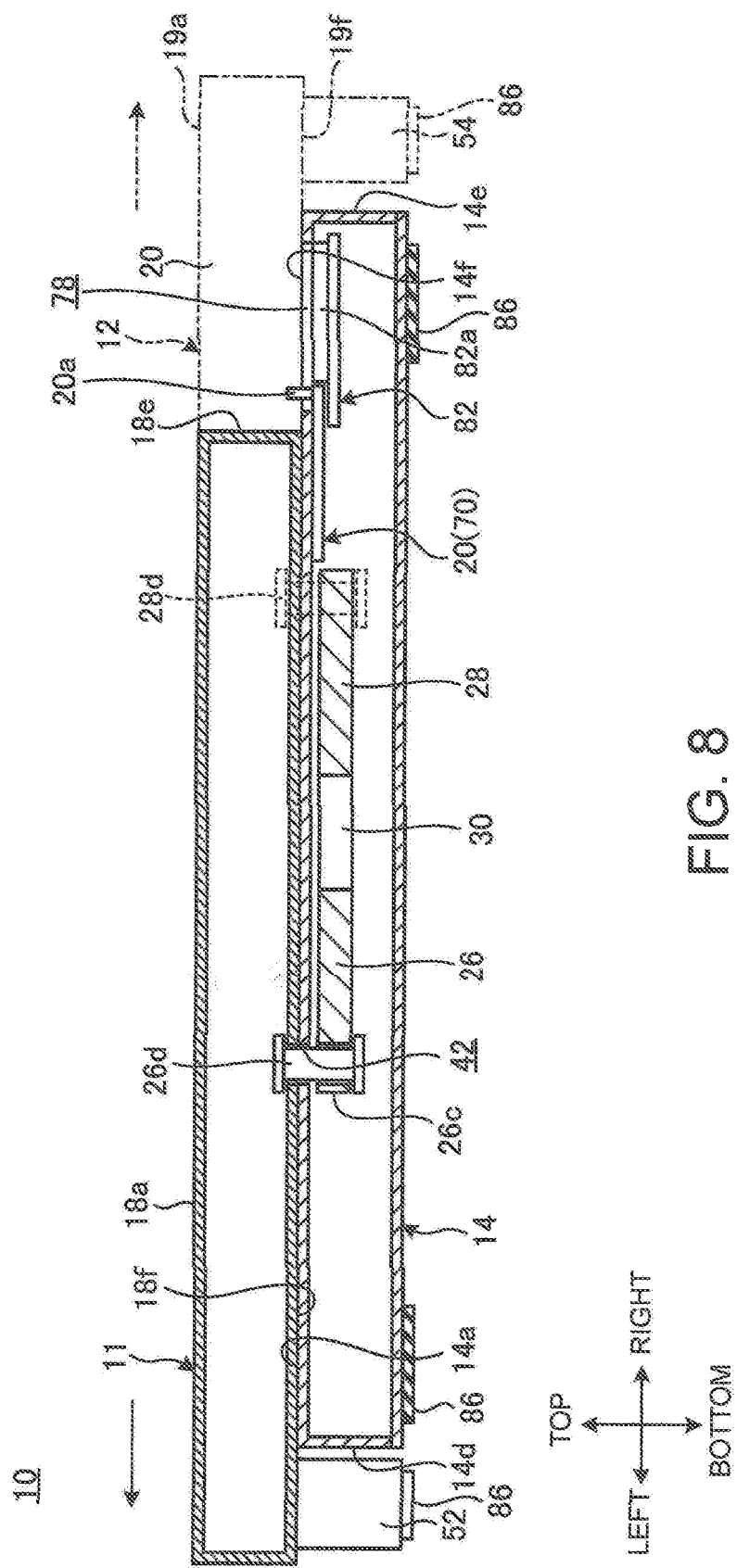
FIG. 8 is a schematic front cross-sectional view of the keyboard device in FIG. 7 in the usage mode.

FIG. 5 is a bottom view schematically illustrating the internal configuration of the keyboard device 10 in the storage mode in FIG. 1. FIG. 6 is a bottom view schematically illustrating the internal configuration of the keyboard device 10 in the usage mode in FIG. 4. FIGS. 5 and 6 illustrate a state of removing the bottom plate of the base 14. FIG. 7 is a schematic front cross-sectional view of the keyboard device 10 in the storage mode in FIG. 1. FIG. 8 is a schematic front cross-sectional view of the keyboard device 10 in FIG. 7 in the usage mode. FIGS. 7 and 8 omit some components, including the key tops 16 and 17, the second unit 12, the button switches 24a to 24c, and auxiliary arms 38 and 40.

As illustrated in FIGS. 5 and 6, the base 14 includes the unit driving mechanism 22 and the operating member 20. The unit driving mechanism 22 is a drive part that physically moves the units 11 and 12 between the storage position and the usage position. The operating member 20 is a member operated by the user to operate the unit driving mechanism 22.

As illustrated in FIGS. 5 and 6, the unit driving mechanism 22 includes first gears 26, second gears, 28, relay gears 30, a pinion 32, a first auxiliary arm 38, and a second auxiliary arm 40.

Two first gears 26 are disposed side by side in the front-rear direction, and are slightly displaced from each other in the left-right direction. Each of the first gears 26 is rotatably supported relative to the back surface of the top face 14a of the base 14 via the rotary shaft 26a. The first gear 26 is a thin plate-like gear and has teeth 26b on most of the outer peripheral face. The first gear 26 has a first arm 26c on a part of the outer peripheral face, the first arm 26c protruding in the outer diameter direction. The first arm 26c rotates together with the first gear 26 about the rotary shaft 26a. The first arm 26c rotatably supports a first connecting shaft 26d at the distal end. The rotation angle range of the first gear 26, i.e., the turning angle range of the first connecting shaft 26d is set to about 120 degrees.

The first connecting shaft 26d passes through an arc-shaped first guide hole 42 formed in the plate of the top face 14a, and is supported rotatably relative to the back surface (base plate 18f) of the first unit 11 (see also FIGS. 7 and 8). The first guide hole 42 extends from a first end on the rear to a second end on the front in the front-rear direction so as to draw an arc to the left, and is an arc-like hole that swells once forward and then extends rearward while continuously drawing the arc. The first guide hole 42 guides the first connecting shaft 26d that moves from the first end toward the second end while turning along the arc shape. That is, the first connecting shaft 26d connects the first arm 26c and the first unit 11 so that the first arm 26c and the first unit 11 are relatively movable along the first guide hole 42.

Two second gears 28 are disposed side by side in the front-rear direction, and are slightly displaced from each other in the left-right direction. Each second gear 28 has a structure that is a point-symmetrically moved structure of the corresponding first gear 26. That is, the second gear has a structure of rotating the first gear 26 by approximately 180 degrees. The second gear 28 includes a rotating shaft 28a, teeth 28b, a second arm 28c, and a second connecting shaft 28d corresponding to the rotating shaft 26a, the teeth 26b, the first second arm 26c, and the first connecting shaft 26d of the first gear 26. Each of the second gears 28 is rotatably supported relative to the back surface of the top face 14a of the base 14 via the rotary shaft 28a. The rotation angle range of the second gear 28, i.e., the turning angle range of the second connecting shaft 28d is set to about 120 degrees.

The second connecting shaft 28d at the distal end of the second arm 28c passes through an arc-shaped second guide hole 44 formed in the plate of the top face 14a, and is supported rotatably relative to the back surface (base plate 19f) of the second unit 12. The second guide hole 44 also has a structure that is a point-symmetrically moved structure of the corresponding first guide hole 42. The second guide hole 44 extends from a first end on the front to a second end on the rear in the front-rear direction so as to draw an arc to the right, and is an arc-like hole that swells once rearward and then extends forward while continuously drawing the arc. The second guide hole 44 guides the second connecting shaft 28d that moves from the first end toward the second end while turning along the arc shape. That is, the second connecting shaft 28d connects the second arm 28c and the second unit 12 so that the second arm 28c and the second unit 12 are relatively movable along the second guide hole 44.

Three relay gears 30 are disposed side by side in the front-rear direction while gradually displacing to the right from the rear to the front. These relay gears 30 are each rotatably supported relative to the back surface of the top face 14a of the base 14 via the rotary shaft, and are a thin-plate like gear with teeth arranged around the entire outer peripheral face. The rearmost relay gear 30 interposes between the rear first gear 26 and the rear second gear 28 and meshes with these gears 26 and 28. The frontmost relay gear 30 interposes between the front first gear 26 and the front second gear 28 and meshes with these gears 26 and 28. The relay gear 30 at the center in the front-rear direction interposes between the rear relay gear 30 and the front relay gear 30 and meshes with these gears, and does not mesh with the gears 26 and 28. The relay gears 30 have a smaller diameter than those of the gears 26 and 28.

The pinion 32 is rotatably supported relative to the back surface of the top face 14a of the base 14 via the rotary shaft. The pinion 32 is placed in front of the frontmost relay gear 30 and meshes with this relay gear 30. The pinion 32 has a smaller diameter than that of the relay gears 30.

The first auxiliary arm 38 is a thin strip-like plate having arc-like ends. The first auxiliary arm 38 is placed on the left of the first gears 26, and is located at an intermediate position between the front and rear first gears 26 and 26 in the front-rear direction.

The first auxiliary arm 38 has a first end as the proximal end, and the first end is rotatably supported relative to the back surface of the top face 14a of the base via the rotary shaft. The first auxiliary arm 38 rotatably supports an auxiliary connecting shaft 38a at a second end as the distal end. The auxiliary connecting shaft 38a passes through an arc-shaped auxiliary guide hole 48 formed in the plate of the top face 14a, and is supported rotatably relative to the back surface (base plate 18f) of the first unit 11. The auxiliary guide hole 48 has substantially the same shape as the first guide hole 42. The auxiliary connecting shaft 38a connects the first auxiliary arm 38 and the first unit 11 so that the first auxiliary arm 38 and the first unit 11 are relatively movable along the auxiliary guide hole 48.

The second auxiliary arm 40 is placed on the right of the second gears 28, and is located at an intermediate position between the front and rear second gears 28 and 28 in the front-rear direction. The second auxiliary arm 40 has a structure that is a point-symmetrically moved structure of the first auxiliary arm 38. That is, the second auxiliary arm 40 has a structure of rotating the first auxiliary arm 38 by approximately 180 degrees. The second auxiliary arm 40 has a first end as the proximal end, and the first end is rotatably supported relative to the back surface of the top face 14a of the base 14 via the rotary shaft. The second auxiliary arm 40 rotatably supports an auxiliary connecting shaft 40a at a second end as the distal end. The auxiliary connecting shaft 40a passes through an arc-shaped auxiliary guide hole 50 formed in the plate of the top face 14a, and is supported rotatably relative to the back surface (base plate 19f) of the second unit 12. The auxiliary guide hole 50 has substantially the same shape as the second guide hole 44. The auxiliary connecting shaft 40a connects the second auxiliary arm 40 and the second unit 12 so that the second auxiliary arm 40 and the second unit 12 are relatively movable along the auxiliary guide hole 50.

With this configuration, the unit driving mechanism 22 turns and moves the units 11 and 12 in the opposite directions on the top face 14a of the base 14 in a mutually synchronized manner (see FIGS. 1 to 6). Specifically the unit drive mechanism 22 rotates the gears 26 and 28 via the pinion 32 and the relay gears 30, thereby moving the units 11 and 12. The number of the first gears 26 and the second gears 28 may be one or three or more. In this case, the number of the relay gears 30 also may be one or five or more. Two or more auxiliary arms 38 and 40 may be provided or may be omitted.

As illustrated in FIGS. 5 and 6, the unit driving mechanism 22 includes first magnet attraction parts 68 at two places, for example. The first magnet attraction parts 68 are to hold the relative position between the unit drive mechanism 22 and the base 14 in the storage position of FIG. 5. Each of the first magnet attraction parts 68 has a pair of magnets 68*a* and 68*b* that can attract each other.

One magnet 68*a* is disposed on the side face of the auxiliary arm 38 or 40 at the distal end. The other magnet 68*b* is disposed at one end in the longitudinal direction of the auxiliary guide hole 48 or 50. Such magnets 68*a* and 68*b* are in contact or are close to each other for attraction at the storage position in FIG. 5. The first magnet attraction parts 68 therefore hold the units 11 and 12 relative to the base via the unit drive mechanism 22 in the storage mode, and suppress rattling. One of the magnets 68*a* and 68*b* may be made of a magnetic material, such as an iron plate. The magnets 68*a* and 68*b* of the first magnet attraction part 68 may be disposed on the side face of the arm 26*c* (28*c*) at the distal end and at one end in the longitudinal direction of the guide hole 42 (44). The first magnet attraction part 68 may have a structure similar to that of the second magnet attraction part 84 described later, and may be disposed on the side faces 18*e* and 19*d* of the units 11 and 12.

As illustrated in FIGS. 5 and 6, the operating member 20 includes an operating lever 70 having the operating part 20*a*, a rack 72, a shutter driving part 74, and an elastic member 76.

The operating member 20 is an integrally formed component made of resin or metal including these operating lever 70, rack 72, and shutter driving part 74, and has a substantially crank shape as a whole (see FIG. 6). The operating member 20 is supported so as to be slidable in the left-right direction relative to the back surface of the top face 14*a* of the base 14, and only a part of the operating lever 70 including the operating part 20*a* is exposed on the top face 14*a*.

The operating lever 70 is disposed in the base member 14 near the right front corner. The operating lever 70 is a rectangular plate that is narrow in the front-rear direction and long in the left-right direction. The operating part 20*a* is a plate piece that rises from the top face at the right end of the operating lever 70.

The top face 14*a* of the base 14 has an opening 78 in a range overlapping the exposed part 14*f* at the right front corner (see FIGS. 1 to 4). The opening 78 is a rectangular hole that is narrow in the front-rear direction and long in the left-right direction, and penetrates through the top face 14*a*. The opening 78 is placed at a position including the exposed part 14*f*, and so a part or all of the opening 78 is always exposed on the top face 14*a* without being hidden by the units 11 and 12, regardless of the position of the units 11 and 12.

In the storage mode of FIG. 5, the operating lever 70 is in a position to cover substantially the entire opening 78 from the below (see FIG. 5). At this time, the operating part 20*a* projects through the opening 78 beyond the top face 14*a* and is placed at the right end of the opening 78 (see FIG. 1). In the usage mode of FIG. 6, the operating lever 70 slides to the left from the storage mode, so that the operating part 20*a* is placed at the left end of the opening 78. This means that the operating lever 70 is placed in a position such that the operating part 20*a* and its peripheral only cover the opening 78 and most of the operating lever 70 is in a position outside the opening 78. That is, the operating part 20*a* is always operable from the outside through the opening 78, and is slidable in the opening 78 in the left-right direction. A user therefore can easily slide the operating part 20*a* from the above of the keyboard device 10 to change the keyboard device 10 between the storage mode and the usage mode.

The operating member 20 has a bridge plate 80 extending obliquely leftward rearward from the left end of the operating lever 70. The rack 72 is a strip-like plate extending to the left from the left rear end of the bridge plate 80. The rack 72 is placed in front of the pinion 32 and behind the button switches 24*a* to 24*c*. The rack 72 is placed in a laterally extending dead space behind the button switches 24*a* to 24*c* that are arranged side by side in the left-right direction.

The rack 72 has teeth 72*a* arranged on the rear side face in the left-right direction, and the teeth 72*a* mesh with the pinion 32. In the storage mode of FIG. 5, the rack 72 is at the rightmost sliding position (storage position), and meshes with the pinion 32 at the left end of the teeth 72*a*. In the usage mode of FIG. 6, the rack 72 is at the leftmost sliding position (usage position), and meshes with the pinion 32 at the right end of the teeth 72*a*. The rack 72 has a slot extending in the left-right direction. A guide pin rising from the chassis of the base 14 is slidably inserted into this slot.

The shutter driving part 74 is a narrow plate extending to the right from the right side face of the bridge plate 80. The shutter driving part 74 has a driving pin 74*a* at the distal end, the driving pin 74*a* protruding downward from the bottom face. The shutter driving part 74 drives a shutter member 82 described later via the driving pin 74*a*.

In one example, the elastic member 76 is a torsion coil spring. The elastic member 76 has a first end attached to the rack 72 and a second end attached to the base 14. In the storage mode of FIG. 5 and the usage mode of FIG. 6, the elastic member 76 is in the neutral state and does not exert the biasing force to the operating member 20. When the operating member 20 slides slightly to the left from the position of FIG. 5, the elastic member 76 releases the accumulated biasing force and biases the operating member 20 to the left. When the operating member 20 slides slightly to the right from the position of FIG. 6, the elastic member 76 releases the accumulated biasing force and biases the operating member 20 to the right.

With this configuration, when the user changes the keyboard device 10 from the storage mode to the usage mode or changes the usage mode to the storage mode, the user simply may start the sliding operation of the operating part 20*a*. This allows the operating member 20 to automatically slide due to the biasing force from the elastic member 76 and then the rack 72 to automatically operate the unit driving mechanism 22 via the pinion 32.

As illustrated in FIGS. 5 and 6, the operating member 20 drives the shutter member 82 as well as the unit driving mechanism 22. The shutter member 82 includes a shutter 82*a*, a pressure receiving hole 82*b*, and a guide 82*c*. The shutter member 82 is a substantially L-letter shaped plate made of resin or metal. The shutter member 82 is supported inside the base 14 so as to be slidable in the front-rear direction, and is placed so that a part of the shutter member 82 overlaps the bottom face of the operating member 20.

The shutter 82*a* is a rectangular plate that is narrow in the front-rear direction and long in the left-right direction. The shutter 82*a* has an outer shape that can cover most of the opening 78.

The pressure receiving hole 82*b* includes a first slot 82*d* extending in the left-right direction and a second slot 82*e* extending diagonally leftward rearward from the first slot 82d. The pressure receiving hole 82b has a substantially boomerang shape as a whole. The pressure receiving hole 82b is configured so that the first slot 82d extends along a rear part of the shutter 82a and the second slot 82e extends diagonally leftward rearward from the shutter 82a to the guide 82c. The guide pin 74a is slidably inserted into the pressure receiving hole 82b.

The guide 82c is a plate located on the left of and behind the shutter 82a and extending in the front-rear direction. The guide 82c has a slot extending in the front-rear direction. A guide pin rising from the chassis of the base 14 is slidably inserted into this slot.

The shutter member 82 slides in the front-rear direction while receiving a pressing force in the front-rear direction when the drive pin 74a sliding together with the operating member 20 slides in the second slot 82e. The drive pin 74a does not press the shutter member 82 during sliding in the first slot 82d, and just slides without applying pressure. In the storage mode of FIG. 5, the shutter 82a of the shutter member 82 is located behind the operating lever 70 that covers the opening 78, and so moves rearward from the opening 78. In the usage mode of FIG. 6, the shutter member 82 moves forward so that the shutter 82a overlaps the opening 78 and covers most of the opening 78 that is open because the operating lever 70 slid.

As illustrated in FIGS. 5 to 8, the first unit 11 has a protrusion 52 that protrudes downward from the bottom face of the base plate 18f. The protrusion 52 is a bulging portion having a substantially trapezoidal shape in plan view, and has a height dimension substantially the same as the thickness of the base 14. The protrusion 52 has a front edge extending in the left-right direction and left and right edges extending in the front-rear direction. The protrusion 52 has a rear edge that is an inclined edge 52a gradually inclined from the rear to the front in the direction from the left to the right. The base 14 has a recessed portion 53 like a cutout on the left side face 14d. The recessed portion 53 has substantially the same shape as the protrusion 52 in plan view. The recessed portion 53 has an inclined edge 53a at the edge that faces the inclined edge 52a of the protrusion 52.

When the first unit 11 is in the storage position, the protrusion 52 is completely stored in the recessed portion 53 (see FIGS. 5 and 7). When the first unit 11 is in the usage position, the protrusion 52 moves out of the recessed portion 53 to the left, and serves as a leg that lands on a desk, for example, on which the keyboard device 10 is placed (see FIG. 8). The inclined edge 52a of the protrusion 52 is configured so as to partially overlap the inclined edge 53a of the recessed portion 53 in both of the storage position of FIG. 5 and the usage position of FIG. 6.

The second unit 12 also has a protrusion 54 that protrudes downward from the bottom face of the base plate 19f. The protrusion 54 is a bulging portion having a substantially trapezoidal shape in plan view, and has a height dimension substantially the same as the thickness of the base 14. The protrusion 54 has a substantially point-symmetrical shape with the protrusion 52. The protrusion 54 has a front edge that is an inclined edge 54a gradually inclined from the rear to the front in the direction from the left to the right. The base 14 has a recessed portion 55 like a cutout on the right side face 14e. The recessed portion 55 has substantially the same shape as the protrusion 54 in plan view. The recessed portion 55 has an inclined edge 55a at the edge that faces the inclined edge 54a of the protrusion 54.

When the second unit 12 is in the storage position, the protrusion 54 is completely stored in the recessed portion 55 (see FIGS. 5 and 7). When the second unit 12 is in the usage position, the protrusion 54 moves out of the recessed portion 55 to the right, and serves as a leg that lands on a desk, for example, on which the keyboard device 10 is placed (see FIG. 8). The inclined edge 54a of the protrusion 54 partially overlaps the inclined edge 55a of the recessed portion 55 in both of the storage position of FIG. 5 and the usage position of FIG. 6 (see also FIG. 9).

As illustrated in FIG. 4, the keyboard device 10 has second magnet attraction parts 84 at three places, for example. The second magnet attraction parts 84 are to hold the relative position between the side faces 18e and 19d of the units 11 and 12 in the usage position of FIG. 4. Each of the second magnet attraction parts 84 has a pair of magnets 84a and 84b that can attract each other.

One magnet 84a is disposed to face the rear face of a part of the right side face 18e of the first unit 11. The other magnet 84b is disposed to face the front face of a part of the left side face 19d of the second unit 12. The magnets 84a and 84b as a pair are in a position facing each other in the usage position of FIG. 4. Such magnets 84a and 84b are in contact or are close to each other for attraction in the storage position in FIG. 4. The second magnet attraction parts 84 therefore attract the units 11 and 12 integrally in the usage mode, and suppress rattling. One of the magnets 84a and 84b may be made of a magnetic material, such as an iron plate. The magnets 84a and 84b of the second magnet attraction part 84 may be disposed to face the right face and the left face of the side faces 18e and 19d, respectively. The second magnet attraction parts 84 may have a structure similar to that of the first magnet attraction part 68, and may be disposed in the unit driving mechanism 22.

As illustrated in FIGS. 1 to 4, FIG. 7 and FIG. 8, the base 14 includes rubber feet 86 at four corners on the bottom face. At least the surface (bottom face) of these rubber feet 86 is made of rubber and has a predetermined anti-slip effect. These rubber feet 86 prevent rattling, abnormal noise, displacement, etc. when the keyboard device 10 is placed on the top face of a desk or the like. The rubber foot 86 at the right front corner of the base 14 is at a position overlapping the operating lever 70 in plan view. Specifically, this rubber foot 86 is always at a position overlapping directly under the operating lever 70 regardless of the sliding position of the operating lever 70 (see FIGS. 1 to 4). This rubber foot 86 may be placed at a position overlapping the operating lever 70 only in one of the usage mode and the storage mode. The rubber foot 86 may be placed only at a position overlapping the operating lever 70. In this case, the rubber foot 86 and the bottom face of the base 14 need to have the same height.

The rubber feet 86 may also be disposed on the bottom faces of the protrusions 52, 54 of the units 11, 12 (see FIG. 8). Note here that preferably the protrusions 52, 54 do not have the rubber feet 86 in consideration of a smooth sliding operation of the units 11 and 12 when the keyboard device 10 is placed on the top face of the desk or the like. In this regard, the legs of the protrusions 52 and 54 may be made of resin having high slidability instead of having the rubber feet 86. The protrusions 52, 54 may not have the rubber feet 86 on their bottom faces, and the bottom face of the protrusions may have the same height as the bottom face of the rubber feet 86 of the base 14.

Next, the following describes a configuration example of the control system of the keyboard device 10.

As illustrated in FIGS. 5 and 6, the control system of the keyboard device 10 includes a main logic board 60, a wireless communication module 61, a sub-logic board 62, a stick board 63, a switch board 64, a battery device 66, and a power switch 67.

When a key top 16 of the key top group mounted on the first unit 11 is pressed, the main logic board 60 converts the analog electrical signal (analog signal) output from the membrane sheet into a digital electrical signal (digital signal). The main logic board 60 is housed in the protrusion 52 protruding from the back surface of the first unit 11. The main logic board 60 also has a function of converting analog signals output from the button switches 24a to 24c into digital signals.

The wireless communication module 61 is integrated with the main logic board 60 into a module. In one example, the wireless communication module 61 is an antenna device conforming to a near field communication standard (for example, Bluetooth (registered trademark)).

When a key top 17 of the key top group mounted on the second unit 12 is pressed, the sub-logic board 62 converts the analog signal output from the membrane sheet into a digital signal. The sub-logic board 62 is housed in the protrusion 54 protruding from the back surface of the second unit 12.

The stick board 63 is disposed close to the back surface of the first unit 11 and outputs a predetermined analog signal in response to an input operation with the pointing stick 15. The analog signal output from the stick board 63 is sent to the main logic board 60 and is converted into a digital signal by the main logic board 60. The stick board 63 may be configured to convert an analog signal in response to the input operation with the pointing stick 15 into a digital signal by itself and send the converted digital signal to the main logic board 60.

The main logic board 60 and the sub-logic board 62 electrically connect via a cable C1. The main logic board 60 and the button switches 24a to 24c electrically connect via a cable C2. The main logic board 60 and the stick board 63 electrically connect via a cable C3. The cable C3 of this embodiment forms a bundle with the cable C2 on the way and connects to the main logic board 60.

The digital signal output from the sub-logic board 62 is sent to the main logic board 60 via the cable C1. The main logic board 60 processes the input signals to the key tops 16 and 17 of the units 11 and 12 as a single keyboard, and sends the signals to the external portable information device via the wireless communication module 61. In other words, although the keyboard device 10 of the present embodiment is divided into the left and right units 11 and 12, the input operation to their key tops 16 and 17 is integrally processed by the main logic board 60, and similarly to the input operation to a single keyboard, the processed operation signal is transmitted to the external portable information device via the wireless communication module 61. Similarly, the input signals with the button switches 24a to 24c and the pointing stick 15 are also sent to the external portable information device via the wireless communication module 61.

In one example, the switch board 64 is disposed in the base 14 at the left rear corner. The switch board 64 detects the on/off operation of the power switch 67 and turns on/off the power of the keyboard device 10. The switch board 64 electrically connects to the main logic board 60 via a cable C4.

The battery device 66 is a power source of the keyboard device 10. The battery device 66 is chargeable from an external power supply device via the connection terminal 21a or using a contactless charging device (not illustrated). The battery device 66 electrically connects to the switch board 64 via a cable C5.

The power switch 67 turns on/off the power of the keyboard device 10. The power switch 67 includes a contact switch, such as a leaf switch or a push switch. The power switch 67 electrically connects to the switch board 64 via the cable C2 or another cable. The power switch 67 is placed near the rack 72 and detects the movement of the rack 72. When the rack 72 is at the storage position of FIG. 5, the power switch 67 is in a non-detection state because the detection piece is away from the rack 72, and so the keyboard device 10 is turned off. While the rack 72 moves from the storage position of FIG. 5 toward the usage position of FIG. 6, the detection piece of the power switch 67 comes in contact with the rack 72 at a position slightly before the usage position of FIG. 6 to turn on the keyboard device 10.

In this way, while the keyboard device 10 changes from the storage mode to the usage mode, the keyboard device 10 is turned on at a stage where the movement progresses by about 80 to 90%, for example (see FIG. 3, for example). While the keyboard device 10 changes from the usage mode to the storage mode, the keyboard device 10 is turned off at a stage where the movement progresses by about 10%, for example (see FIG. 3, for example). The power switch 67 may be placed to turn on/off the power at the moment when the rack 72 reaches the usage position of FIG. 6 or immediately before the moment. The power switch 67 may be placed to detect the position of a moving element other than the rack 72.

In this way, although the keyboard device 10 has a structure in which the left and right units 11 and 12 are completely divided, the units 11 and 12 have their respective logic boards 60 and 62, and these logic boards are connected by the cable C1. The keyboard device 10 therefore enables appropriate control as a single keyboard. The keyboard device 10 has the wireless communication module 61 mounted on the protrusion 52 of the first unit 11, which laterally protrudes from the top face 14a of the base 14 in the usage mode. This greatly prevents the wireless communication module 61 from having a component disposed around it that may shield radio waves, and so achieves high communication quality. While the keyboard device 10 changes from the storage mode to the usage mode, the keyboard device 10 is automatically turned on before the completion of the movement, and connects to an external device via the wireless communication module 61. This means that the keyboard device 10 becomes ready for use at the same time when the keyboard device 10 changes to the usage mode.

Next, the following describes the operation and advantageous effects of the keyboard device 10.

When the keyboard device 10 is in the storage mode of FIG. 1, the stepwise side faces 18e and 19d of the units 11 and 12 are displaced in the front-rear direction and come in contact while meshing with each other as described above. The keyboard device 10 in the storage mode is configured like a single plate having the smallest outer shape where the units 11 and 12 are stored on the top face 14a of the base 14. Therefore, while the keyboard device 10 has the key tops 16 and 17 having a full size key pitch, the keyboard device 10 can be miniaturized as much as possible when not in use. The thickness of the keyboard device 10 does not change between the storage mode and the usage mode, and so the keyboard device 10 always can be kept thin regardless of the mode. The keyboard device 10 therefore can be put inside the chassis of a foldable portable information device, for example, for carrying.

As illustrated in FIG. 5, the rack 72 of the operating member 20 in the storage mode is at the rightmost position so that the operating lever 70 covers the opening 78. In this mode, the unit drive mechanism 22 is the position so that the first gears 26 rotate to the most clockwise position in FIG. 5 and the second gears 28 also rotate to the most clockwise position in FIG. 5. As in FIG. 1 illustrating the storage mode, the opening 78 is partially covered with the first unit 11, and the rest is covered with the operating lever 70. With this configuration, the keyboard device 10 in the storage mode of FIG. 1 does not have appearance having the opening 78 that is open without a cover.

To change the keyboard device 10 from the storage mode to the usage mode of FIG. 4, a user may slide the operating part 20a exposed above the top face 14a with a fingertip, for example, to the left as illustrated in FIG. 1. Then, the rack 72 slides to the left together with the operating lever 70 to rotate the pinion 32 counterclockwise in FIG. 5. When the pinion 32 rotates counterclockwise in FIG. 5, the frontmost relay gear 30 rotates clockwise, and the rearmost relay gear 30 also rotates clockwise via the intermediate relay gear 30. The first gears 26 therefore rotate counterclockwise in FIG. 5, and the second gears 28 also rotate counterclockwise.

The first arm 26c rotates counterclockwise about the rotary shaft 26a. The first connecting shaft 26d at the distal end of the first arm 26c therefore turns and moves in the first guide hole 42 counterclockwise about the rotary shaft 26a. The second arm 28c also rotates counterclockwise about the rotary shaft 28a. The second connecting shaft 28d at the distal end of the second arm 28c therefore turns and moves in the second guide hole 44 counterclockwise about the rotary shaft 28a. As these connecting shafts 26d and 28d turn counterclockwise, the units 11 and 12 rotatably connecting to these shafts also move counterclockwise in FIG. 5 on the top face 14a. As a result, the keyboard device 10 becomes the usage mode of FIGS. 4 and 6. That is, in the plan view of FIG. 1, these units 11 and 12 turn and move clockwise on the top face 14a of the base 14 (see FIGS. 2 to 3), and finally are in the usage mode of FIG. 4.

During such a movement from the storage mode to the usage mode, the shutter member 82 slides forward along with the displacement of the operating lever 70 from the opening 78 because the driving pin 74a presses the inner periphery of the second slot 82e. As a result, the shutter 82a gradually covers the opening 78 that is not covered after the movement of the operating lever 70.

While the units 11 and 12 change from the storage position to the usage position, the keyboard device 10 is turned on when the power switch 67 detects the rack 72 at a point closer to the usage position than the middle point of its movement range (for example, a point moved by about 80 to 90%). As a result, the keyboard device 10 is already turned on when it becomes the usage mode, and so connects to an external device via the wireless communication module 61. The user therefore starts using the keyboard device 10 at the same time when the keyboard device 10 changes to the usage mode.

In the usage mode, the keyboard device 10 defines a single full-sized keyboard where the left and the right units 11 and 12 are arranged side by side in the left-right direction. The keyboard device 10 therefore has a sufficient key pitch during use. In the usage mode, the button switches 24a to 24c are exposed (see FIG. 4). Such a keyboard device 10 provides a mouse substitute function with the pointing stick 15 and the button switches 24a to 24c when there is no separate mouse, for example. The keyboard device 10 in the usage mode has the protrusions 52 and 54 protruding from the back surface of the units 11 and 12 that extend to the left and right from the top face 14a of the base 14, and these protrusions 52 and 54 serve as the legs. With this configuration, the units 11 and 12 of the keyboard device 10 extending to the left and right are stable on the desk or the like, and the operability further improves.

In this usage mode, the opening 78 as a whole is exposed on the top face 14a (see FIG. 4), a part thereof is covered with the operating lever 70 and the rest is covered with the shutter 82a. With this configuration, the keyboard device 10 also in this usage mode of FIG. 4 does not have appearance having the opening 78 that is open without a cover.

When the keyboard device 10 changes from the storage mode to the usage mode as described above, the units 11 and turn and move in the same direction, so that their stepwise side faces 18e and 19d do not interfere with each other and move smoothly. The units 11 and 12 of the keyboard device 10 turn in the same direction, and so these units do not interfere with the operating part 20a and the bulging part 21 on the top face 14a of the base 14. That is, the keyboard device 10 has a space (exposed parts 14f and 14g) on the top face 14a that does not interfere with the units 11 and 12, so that the operating part 20a and the bulging part 21 (connecting terminal 21a) having a certain thickness can be easily placed on the top face 14a.

In the keyboard device 10, the pinion 32 driven by the rack 72 has the smallest diameter, the relay gears 30 have the second smallest diameter, and the gears 26, 28 that finally drive the units 11, 12 have the largest diameter. With this configuration, the drive of the pinion 32 is decelerated and transmitted to the units 11 and 12, so that the units 11 and 12 can move largely while suppressing the movement of the rack 72 as much as possible. In this way, the operating part 20a can largely move the units 11 and 12 with a minimum slide operation.

The operation from the usage mode to the storage mode is the reverse of the above operation. That is, the user may slide the operating part 20a in the usage mode of FIG. 4 in the direction opposite to the above operation to change the keyboard device 10 to the storage mode.

As described above, the keyboard device 10 according to the present embodiment includes the unit driving mechanism 22 that relatively moves the units 11 and 12 between the storage position and the usage position, and the operating part 20a exposed on the top face 14a of the base 14. The keyboard device 10 also includes the operating member 20 to move the unit driving mechanism 22 in response to the operation of the operating part 20a.

The keyboard device 10 therefore is configured to move the units 11 and 12 with the operating part 20a of the operating member 20. A user therefore may simply operate the operating part 20a with a fingertip or the like to change the units 11 and 12 from the usage position where the power supply of the keyboard device 10 is turned on to the storage position. That is, the user does not have to perform this storage operation of this keyboard device 10 while holding the units 11 and 12 with the hand. This prevents the user from erroneously pressing the key tops 16, 17 during this operation, and so suppresses an unintended operation of the keyboard device.

The operating part 20a is disposed at the operating member 20 that slides to the left and right. In this way, in the keyboard device 10, the operation of the operating part 20a is a slide operation, while the operation of the key tops 16 and 17 is a depression operation. The operation of the operating part 20a is therefore clearly distinguished from the key tops 16 and 17 operated in the usage mode, and this suppresses erroneous operation of the operating part 20a during use.

The base 14 has the rubber foot 86 on the bottom face at least at a position overlapping the operating lever 70. During the user's operation with the operating part 20a, the rubber foot 86 located below comes into close contact with the top face of the desk or the like, and this suppresses slipping of the base 14. The user is therefore allowed to stably slide the operating part 20a. With the rubber foot 86 located below the operating lever 70, the user is allowed to slide the operating part 20a while applying a load thereto, and so the stability of the operation further improves.

Figure 9A:
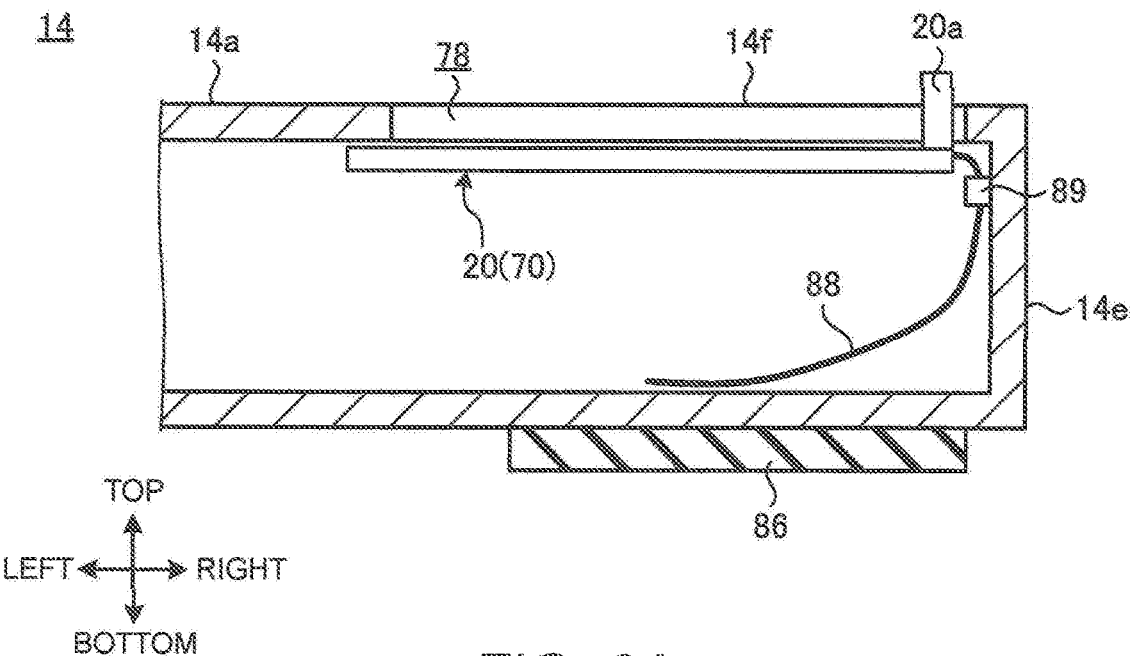
FIG. 9A is a schematic front cross-sectional view of the configuration of a shutter member that is a modified example in the storage mode.
Figure 9B:
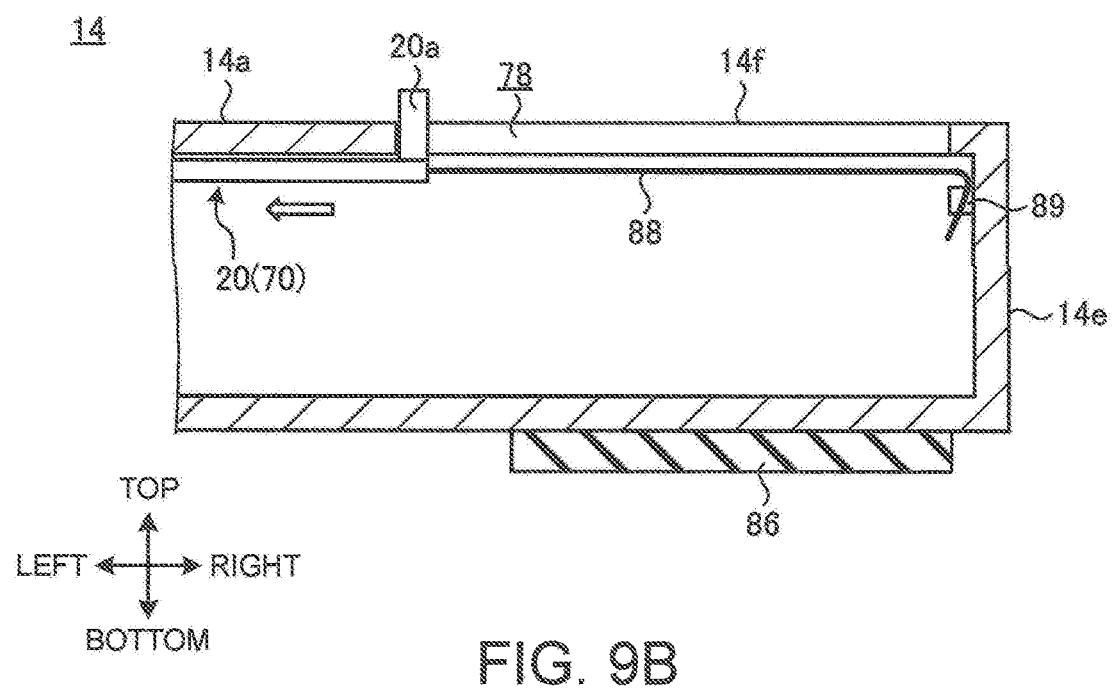
FIG. 9B is a schematic front cross-sectional view of the configuration of the shutter member in FIG. 9A in the usage mode.

FIG. 9A is a schematic front cross-sectional view of the configuration of a shutter member 88 that is a modified example in the storage mode. FIG. 9B is a schematic front cross-sectional view of the configuration of the shutter member 88 in FIG. 9A in the usage mode.

As illustrated in FIGS. 9A and 9B, the shutter member 88 does not have the pressure receiving hole 82b and the guide 82c unlike the shutter member 82 of FIGS. 5 and 6, and has a shutter 88a instead of the shutter 82a. The shutter member 88 is a flexible sheet member. The shutter member 88 has a first end connecting to the right end of the operating lever 70, and a second end held in the base 14 in a freely movable state. Reference numeral 89 in FIG. 9A denotes a guide to guide the shutter member 88 for smooth movement. The shutter member 88 passes through the guide 89 and is slidably held.

As the operating lever 70 slides to the left and right, the shutter member 88 accordingly slides to the left and right. In the usage mode of FIG. 9B, the operating lever 70 only partially covers the opening 78, and the shutter member 88 then covers the rest of the opening 78. The shutter member 88 may include a plurality of connected slats instead of the sheet member, or may have a configuration similar to a general shutter installed in a store, a garage, or the like.

The above keyboard device is configured to let the user slide the operating part 20a with a fingertip to change the keyboard device 10 to the storage mode or the usage mode. The keyboard device 10 may include an automatic storage mechanism 90 capable of semi-automatically executing an operation of changing the keyboard device 10 from the usage mode to the storage mode of these operations.

Figure 10A:
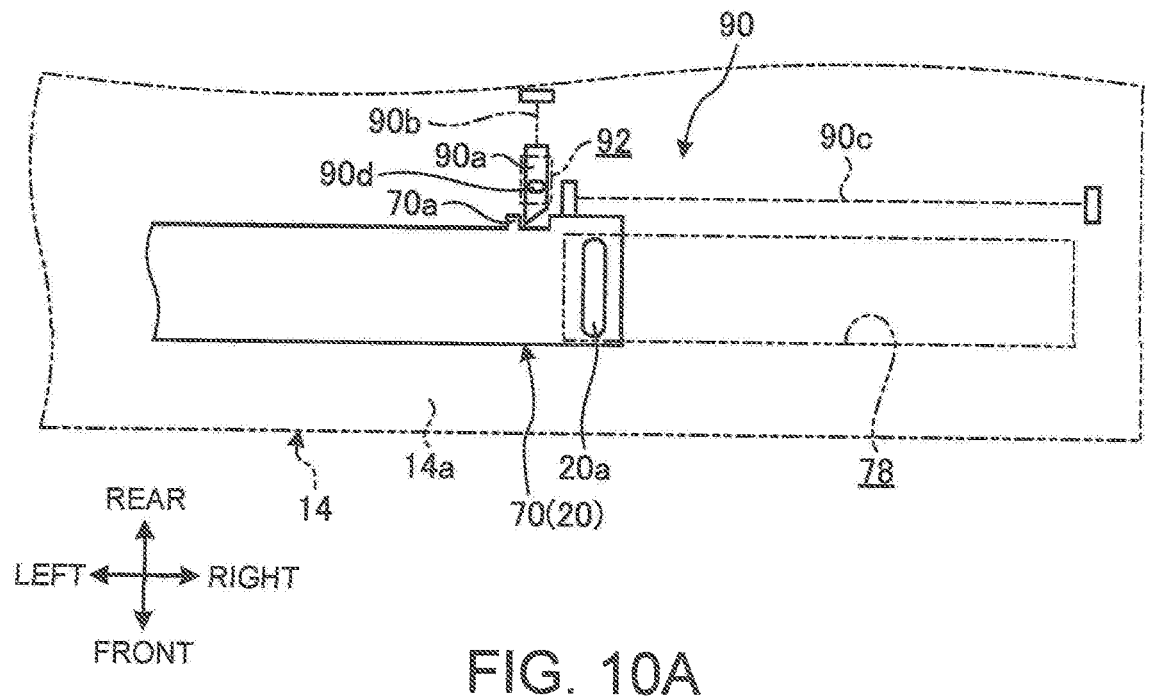
FIG. 10A is a schematic plan view of a configuration of an automatic storage mechanism in the usage mode.
Figure 10B:
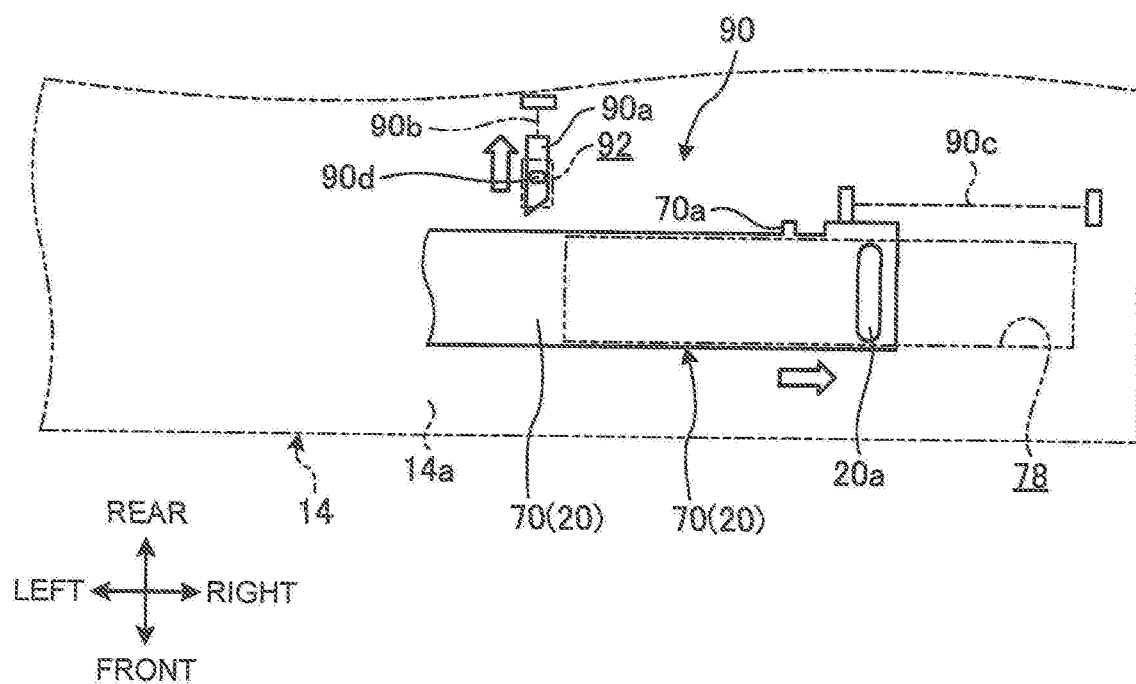
FIG. 10B is a schematic plan view of a configuration of the automatic storage mechanism during a change from the usage mode to the storage mode.

FIG. 10A is a schematic plan view of a configuration of the automatic storage mechanism 90 in the usage mode. FIG. 10B is a schematic plan view of a configuration of the automatic storage mechanism 90 during a change from the usage mode to the storage mode. FIGS. 10A and 10B omit the elements of the operating member 20 other than the operating lever 70, the shutter member 82 and the like.

The automatic storage mechanism 90 is disposed inside the base 14. As illustrated in FIGS. 10A and 10B, the automatic storage mechanism 90 includes a latch 90a and elastic members 90b and 90c. In the configuration including the automatic storage mechanism 90, the operating lever 70 includes a locking piece 70a on its rear side face, for example.

The latch 90a is disposed movably in the front-rear direction inside the base 14, and is placed behind the operating lever 70. The latch 90a is always biased by the elastic member 90b in the direction of moving forward. The latch 90a has a latch operating part 90d rising from the top face. A user can operate the latch operating part 90d through a slot 92 in the top face 14a of the base 14, the slot extending in the front-rear direction. The elastic member 90c con- stantly biases the operating lever 70 toward the storage position (to the right in FIG. 9A).

In the usage mode of FIG. 10A, the elastic member 90b of the automatic storage mechanism 90 gives the biasing force to the latch 90a, and this latch 90a locks the locking piece 70a of the operating lever 70 at the usage position. The operating lever 70 therefore stops at the usage position against the biasing force of the elastic member 90c. To change the keyboard device 10 from the usage mode to the storage mode, the user operates the latch operating part 90d to move the latch 90a backward against the biasing force of the elastic member 90b. This cancels the locking state of the locking piece 70a by the latch 90a, so that the operating lever 70 slides toward the storage position (to the right in the drawing) by the biasing force of the elastic member 90b. As a result, the operating member 20 drives the unit drive mechanism 22, and the keyboard device 10 automatically changes to the storage mode.

The present invention is not limited to the above-described embodiment, and can be modified freely without deviating from the scope of the present invention.

The above embodiment describes an example of the configuration where the first unit 11 is placed at a front part of the base 14 and the second unit 12 is placed behind the first unit 11 in the storage mode of FIG. 1. In another configuration, the units 11 and 12 in the storage mode of FIG. 1 may be reversed on the left and right so that the second unit 12 is placed on the front and the first unit 11 is placed on the rear.

The above embodiment has the pointing stick 15 in the first unit 11. In another embodiment, the second unit 12 may have the pointing stick 15.

The invention claimed is:

1. A keyboard device comprising:
a first unit having a plurality of first key tops and a stepwise first side face;
a second unit having a plurality of second key tops and a stepwise second side face to abut and mesh with the first side face, the second unit being disposed adjacent to the first unit;
a base member having a top face on which the first unit and the second unit are disposed, the base supporting the first unit and the second unit for relative movement on the top face;
a unit driving mechanism configured to move the first unit and the second unit between a storage position and a usage position by turning and moving the first unit and the second unit in a same direction so that the first unit and the second unit move along an arc from the storage position to the usage position; in the storage position, the first side face and the second side face mesh with each other while being displaced in a front-rear direction of the keyboard device; in the usage position, the first side face and the second side face mesh with each other without being displaced in the front-rear direction whereby the first and second units are placed side by side in a left-right direction of the keyboard device to define a single keyboard; and
an operating member having an operating part exposed on the top face of the base member, the operating member being configured to move the first unit and the second unit between the usage position and the storage position in response to a user's operation of the operating part to move the unit driving mechanism;
wherein the operating part is always at least partially exposed on the top face regardless of position of the first unit and the second unit.

2. The keyboard device according to claim 1, wherein
the base has an opening in the top face, the opening is always at least partially exposed on the top face regardless of position of the first unit and the second unit,
the operating member has an operating lever that is slidably supported inside the base, and
the operating part is disposed on the operating lever and is exposed on the top face of the base through the opening.

3. The keyboard device according to claim 2, further comprising
a shutter member configured to operate with the operating lever, and open and close the opening, wherein
the shutter member is at a position rearward from the opening when the first unit and the second unit are in the storage position, and is at a position covering the opening when the first unit and the second unit are in the usage position.

4. The keyboard device according to claim 2, wherein
the unit driving mechanism includes:
 a first gear configured to be rotatably supported to the base and has a first arm protruding from an outer peripheral face thereof, the first arm having a first connecting shaft at a distal end thereof, the first gear rotatably connected to the first unit via the first connecting shaft;
 a second gear configured to be rotatably supported to the base and having a second arm protruding from an outer peripheral face thereof, the second arm having a second connecting shaft at a distal end thereof, the second gear rotatably connected to the second unit via the second connecting shaft;
 a relay gear configured to be rotatably supported to the base, the relay gear meshes with the first gear and the second gear to rotate the first gear and the second gear in a same direction and in a synchronized manner; and
 a pinion configured to be rotatably supported to the base, the pinion meshes with the relay gear, and
the operating member further includes a rack disposed inside the base to be integral and slidable with the operating lever, the rack meshes with the pinion.

5. The keyboard device according to claim 2, wherein
in the storage position, the first unit is disposed along a front edge of the top face of the base, and the second unit is disposed along a rear edge of the top face of the base, and
the opening is disposed at a part of the base that is lateral to a frontmost side face part of the stepwise first side face, and near a corner between the front edge and a side edge of the base.

6. The keyboard device according to claim 2, wherein
the base has at least one rubber foot on the bottom face, and
the at least one rubber foot is at a position overlapping the operating lever.

7. The keyboard device according to claim 4, further comprising
a first magnet attraction part configured to hold a relative position between the unit driving mechanism and the base in the storage position.

8. The keyboard device according to claim 1, further comprising
a second magnet attraction part configured to hold a relative position between the first side face and the second side face in the usage position.

9. The keyboard device according to claim 1, further comprising:
 a power switch configured to turn on the keyboard device during movement of the first unit and the second unit from the storage position to the usage position when the first and second units are closer to the usage position than when at a middle point of a movement range between the storage position and the usage position; and
 a wireless communication module configured to wirelessly transmit a signal from the keyboard device to an external device when the power switch turns on the keyboard device.

10. A keyboard device comprising:
 a first unit having a plurality of first key tops and a stepwise first side face;
 a second unit having a plurality of second key tops and a stepwise second side face to abut and mesh with the first side face, the second unit being disposed adjacent to the first unit;
 a base member having a top face on which the first unit and the second unit are disposed, the base supporting the first unit and the second unit for relative movement on the top face;
 a unit driving mechanism configured to move the first unit and the second unit between a storage position and a usage position by turning and moving the first unit and the second unit in a same direction so that the first unit and the second unit move along an arc from the storage position to the usage position; in the storage position, the first side face and the second side face mesh with each other while being displaced in a front-rear direction of the keyboard device; in the usage position, the first side face and the second side face mesh with each other without being displaced in the front-rear direction so that the first and second units are placed side by side in a left-right direction of the keyboard device to define a single keyboard;
 an operating member having an operating part exposed on the top face of the base member, the operating member being configured to move the first unit and the second unit between the usage position and the storage position in response to a user's operation of the operating part to move the unit driving mechanism;
 wherein the operating part is always at least partially exposed on the top face regardless of position of the first unit and the second unit;
 a power switch configured to turn on the keyboard device during movement of the first unit and the second unit from the storage position to the usage position when the first and second units are closer to the usage position than when at a middle point of a movement range between the storage position and the usage position; and
 a wireless communication module configured to wirelessly transmit a signal from the keyboard device to an external device when the power switch turns on the keyboard device.

11. A keyboard device comprising:
 a first chassis including a first plurality of key tops, the first chassis being formed with a step-wise first side surface;
 a second chassis including a second plurality of key tops, the second chassis being formed with a step-wise second side surface;

a base chassis having a top surface, the first chassis and the second chassis being movably disposed on the top surface of the base chassis;

a plurality of gears coupled to the first chassis and the second chassis; and a switch coupled to the plurality of gears, wherein the switch is configured to, when operated by a user, cause the plurality of gears to move the first chassis and the second chassis along respective arcs between a first position and a second position, the first position being defined as the first side surface meshing with the second side surface while the first chassis and the second chassis are offset from each other along a particular direction, the second position being defined as the first side surface meshing with the second side surface while the first chassis and the second chassis are aligned with each other along the particular direction, and the switch is disposed to be at least partially exposed at the top surface of the base chassis both when the first chassis and the second chassis are in the first position and when the first chassis and the second chassis are in the second position.

\* \* \* \* \*